(12) United States Patent
Wang et al.

(10) Patent No.: US 10,831,612 B2
(45) Date of Patent: Nov. 10, 2020

(54) PRIMARY NODE-STANDBY NODE DATA TRANSMISSION METHOD, CONTROL NODE, AND DATABASE SYSTEM

(71) Applicant: Huawei Technologies Co., Ltd., Shenzhen (CN)

(72) Inventors: Wei Wang, Beijing (CN); Jian Li, Beijing (CN); Wentao Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/522,073

(22) Filed: Jul. 25, 2019

(65) Prior Publication Data

US 2019/0347167 A1 Nov. 14, 2019

Related U.S. Application Data

(63) Continuation of application No. PCT/CN2017/095477, filed on Aug. 1, 2017.

(30) Foreign Application Priority Data

Jan. 26, 2017 (CN) .......................... 2017 1 0057471

(51) Int. Cl.
*G06F 12/00* (2006.01)
*G06F 11/14* (2006.01)

(52) U.S. Cl.
CPC ...... *G06F 11/1464* (2013.01); *G06F 11/1451* (2013.01); *G06F 11/1471* (2013.01)

(58) Field of Classification Search
CPC ............. G06F 11/1464; G06F 11/1451; G06F 11/1471
See application file for complete search history.

(56) References Cited

U.S. PATENT DOCUMENTS 5,555,404 A * 9/1996 Torbjørnsen ........ G06F 11/2094
8,069,366 B1 * 11/2011 Wenzel ................... H04L 69/18
714/6.3

(Continued)

FOREIGN PATENT DOCUMENTS

CN 101446972 A 6/2009
CN 102081611 A 6/2011
(Continued)

OTHER PUBLICATIONS

Machine Translation and Abstract of Chinese Publication No. CN101446972, Jun. 3, 2009, 27 pages.
(Continued)

*Primary Examiner* — John A Lane
(74) *Attorney, Agent, or Firm* — Conley Rose, P.C.

(57) ABSTRACT

A primary node-standby node data transmission method includes an indication that a control node obtains an operation log generated by a primary node, where the operation log includes at least one operation record, and each operation record indicates a record of performing, by the primary node, a write operation on a local cache or a storage unit in a storage device. The method further includes the control node determining a first storage unit set that corresponds to a first standby node, the control node determining a second storage unit set that corresponds to the at least one operation record, the control node obtaining an operation record from the operation log, and the control node sending the corresponding operation record to the first standby node, where the storage unit intersection set is an intersection set of storage units in the first storage unit set and the second storage unit set.

20 Claims, 14 Drawing Sheets

(56) References Cited

U.S. PATENT DOCUMENTS

| | | | |
|---|---|---|---|
| 8,145,838 B1* | 3/2012 | Miller | G06F 11/2048 |
| | | | 711/114 |
| 8,327,186 B2* | 12/2012 | Coatney | G06F 11/2033 |
| | | | 714/6.3 |
| 9,785,510 B1* | 10/2017 | Madhavarapu | G06F 3/065 |
| 2007/0220059 A1* | 9/2007 | Lu | G06F 16/2358 |
| 2014/0324785 A1* | 10/2014 | Gupta | G06F 16/2365 |
| | | | 707/689 |
| 2015/0347237 A1 | 12/2015 | Schefe et al. | |
| 2018/0096045 A1* | 4/2018 | Merriman | G06F 16/273 |
| 2019/0042638 A1* | 2/2019 | Jujjuri | G06F 16/275 |

FOREIGN PATENT DOCUMENTS

| | | |
|---|---|---|
| CN | 102708150 A | 10/2012 |
| CN | 105045877 A | 11/2015 |

OTHER PUBLICATIONS

Machine Translation and Abstract of Chinese Publication No. CN102081611, Jun. 1, 2011, 19 pages.

Machine Translation and Abstract of Chinese Publication No. CN102708150, Oct. 3, 2012, 16 pages.

Machine Translation and Abstract of Chinese Publication No. CN105045877, Nov. 11, 2015, 52 pages.

Foreign Communication From A Counterpart Application, PCT Application No. PCT/CN2017/095477, English Translation of International Search Report dated Nov. 2, 2017, 2 pages.

Foreign Communication From A Counterpart Application, PCT Application No. PCT/CN2017/095477, English Translation of Written Opinion dated Nov. 2, 2017, 5 pages.

* cited by examiner

US 10,831,612 B2

PRIMARY NODE-STANDBY NODE DATA TRANSMISSION METHOD, CONTROL NODE, AND DATABASE SYSTEM

CROSS-REFERENCE TO RELATED APPLICATIONS

This application is a continuation application of International Patent Application No. PCT/CN2017/095477 filed on Aug. 1, 2017, which claims priority to Chinese Patent Application No. 201710057471.X filed on Jan. 26, 2017. The disclosures of the aforementioned applications are hereby incorporated by reference in their entireties.

TECHNICAL FIELD

The present disclosure relates to the field of shared storage technologies, and in particular, to a primary node-standby node data transmission method, a control node, and a database system.

BACKGROUND

In a cluster system based on a shared storage architecture, a primary node and a standby node share a same storage device. Because a storage device is used, both the primary node and the standby node can use data of the storage device. The data of the storage device may be, for example, database data. Cluster software manages data primary node/standby node access performed by the primary node and the standby node.

For a one-write multi-read cluster system, the cluster system provides an external service using a virtual Internet Protocol (IP) address. Both the primary node and the standby node can access a same page on the storage device. To accelerate an access speed, the primary node and the standby node usually synchronize a required page to a local cache (memory). However, only the primary node can perform a write operation on the page, and the standby node performs only a read operation on the page. When providing a service, the primary node may read/write a page on the storage device. When modifying a page, the primary node sends related modification information to the standby node such that the standby node applies the modification information to the memory, and a page related to the memory is synchronized with the same page of the primary node.

However, when there are a large quantity of standby nodes, if the primary node frequently performs a read/write transaction, the primary node in the cluster system continuously broadcasts related modification information to the standby nodes, and the standby nodes continuously perform corresponding processing. This causes excessive consumption of a central processing unit (CPU) of the primary node/standby node, and massive occupation of network bandwidth resources.

SUMMARY

Embodiments of the present disclosure provide a primary node-standby node data transmission method, a control node, and a database system in order to reduce invalid data transmission between a primary node and a standby node, thereby reducing CPU consumption of the primary node/standby node and network bandwidth resource waste.

According to a first aspect, an embodiment of the present disclosure provides a primary node-standby node data transmission method. The method is applied to a database system, and includes receiving, by a control node, an operation log sent by a primary node, where the operation log includes at least one operation record, each operation record corresponds to one storage unit, and each operation record indicates a record of performing, by the primary node, a write operation on a local cache of the primary node or a storage unit in a storage device, determining, for a first standby node, a first storage unit set in the first standby node, and determining a second storage unit set corresponding to the at least one operation record, where the first standby node is any one of at least one standby node, generating a storage unit intersection set according to a storage unit that exists in both the first storage unit set and the second storage unit set, and obtaining an operation record corresponding to the storage unit intersection set from the operation log, and sending the corresponding operation record to the first standby node.

The foregoing first aspect describes, from a perspective of the control node, the primary node-standby node data transmission method provided in this embodiment of the present disclosure. By implementing the method, the standby node may receive only an operation record corresponding to the standby node. Therefore, the invalid data transmission between the primary node and the standby node can be reduced in order to reduce the CPU consumption of the primary node/standby node and the network bandwidth resource waste.

A storage unit is used to describe database data of a specific storage area, and the storage unit refers to fixed-size storage space in which data is recorded. With reference to the first aspect, in some possible implementations, the storage unit may be a page, or may be data storage space defined in another form, such as a block or a sector.

In the database system described in this embodiment of the present disclosure, the primary node may perform a write operation on the storage unit, and the standby node performs only a read operation on the storage unit. Further, when performing a read/write transaction, the primary node performs the write operation on database data in the storage unit, the storage unit is modified, and the primary node records an operation record of modifying the storage unit. Each operation record corresponds to one storage unit, and each operation record indicates a record of performing, by the primary node, a write operation on the local cache or a storage unit in the storage device. When the primary node completes storage unit modification and performs transaction committing, the primary node summarizes all operation records to generate the operation log. In a specific implementation, the storage unit is a page, and each operation record corresponds to one page. The operation record is, for example, a redo log for a modified page, and the operation log is, for example, a set of redo logs for all modified pages.

With reference to the first aspect, in some possible implementations, determining a first storage unit set corresponding to the first standby node includes determining the first storage unit set in the first standby node according to a mapping table.

In a specific implementation, the mapping table is preset in the primary node. The mapping table includes at least one entry, and each entry may include an identifier of a standby node, identifiers of storage units (such as pages) in a local cache of the standby node, an address of the standby node, and the like. Further, the identifier of the standby node may be a standby node number, the identifier of the storage unit may be a storage unit number (such as a page number), and the address of the standby node may be an IP/media access control (MAC) address of the standby node. It can be understood that the primary node may determine a storage unit in any standby node in the database system by querying the mapping table in order to determine the first storage unit set in the standby node.

In a specific implementation, the operation log includes all operation records, and each operation record includes a corresponding page identifier. Therefore, the control node may determine, using the page identifier, a page corresponding to the operation log in order to determine the second storage unit set corresponding to the operation log.

It can be understood that the control node obtains an intersection set between the first storage unit set and the second storage unit set, to obtain the storage unit intersection set, that is, a storage unit in the storage unit intersection set exists in both the first storage unit set and the second storage unit set.

The mapping table is set in the control node, and the identifier of the storage unit (such as the page) is configured in the operation record. Therefore, the control node may effectively determine which page is updated by the primary node and which page is required by the standby node. It can be understood that the primary node sends, according to a page in the standby node, an operation record required by the standby node to the standby node. All operation records received by the standby node are operation records required by the standby node. Therefore, an operation record discard case can be avoided. The standby node updates a related page based on the operation record. This can maintain synchronous updating of data of a same page in the primary node and the standby node in order to meet a user requirement in a one write multi-read database system.

In a specific implementation, the control node determines a $K^{th}$ storage unit set in a $K^{th}$ standby node according to the mapping table, where the $K^{th}$ standby node is a standby node in the at least one standby node other than the first standby node, and the $K^{th}$ storage unit set is inconsistent with the first storage unit set. That is, in the database system, there are at least two standby nodes, and storage units corresponding to local caches of different standby nodes are inconsistent. Correspondingly, the mapping table includes at least two entries, and identifiers of storage units corresponding to different entries are inconsistent. Inconsistency means not exactly same.

With reference to the first aspect, in some possible implementations, the method further includes receiving, by the control node, a mapping table update request sent by a second standby node, where the mapping table update request includes an identifier of the second standby node and an identifier of a storage unit, and the second standby node is one of the at least one standby node, and querying, by the control node in the mapping table, an entry corresponding to the identifier of the second standby node, and adding the identifier of the storage unit to the entry corresponding to the identifier of the second standby node.

Further, the mapping table update request may be a registration request or a deletion request.

Further, in some possible implementations, the control node receives a registration request sent by a second standby node, where the registration request includes an identifier of the second standby node and an identifier of a to-be-registered storage unit, and the second standby node is any one of the at least one standby node. The control node queries, in the mapping table, an entry corresponding to the identifier of the second standby node, and adds the identifier of the to-be-registered storage unit to the entry corresponding to the identifier of the second standby node.

Further, in this embodiment of the present disclosure, because standby nodes share a storage medium, when a user needs to view database data, the user may send an instruction to the standby node. After receiving the instruction, the standby node first determines whether the local cache includes a storage unit corresponding to the instruction, and if the local cache does not include the storage unit corresponding to the instruction, the standby node needs to read the corresponding storage unit from the storage device and write the corresponding storage unit to the local cache.

It can be understood that if the standby node reads the corresponding storage unit from the storage device and writes the corresponding storage unit to the local cache, a quantity of storage units in the local cache changes. In this case, to notify the control node of a changing status of the quantity of storage units in the local cache of the standby node, the standby node correspondingly generates a registration request, and sends the registration request to the control node. The registration request includes an identifier of the standby node and an identifier of a to-be-registered storage unit (that is, an identifier of the storage unit that is read and written). After receiving the registration request, the control node determines, according to the identifier of the standby node, a mapping table entry corresponding to the identifier of the standby node, and adds the identifier of the to-be-registered storage unit to the entry corresponding to the identifier of the standby node, to update the mapping table.

Further, in some possible implementations, the control node receives a deletion request sent by a third standby node, where the deletion request includes an identifier of the third standby node and an identifier of a to-be-deleted storage unit, and the third standby node is any one of the at least one standby node. The control node queries, in the mapping table, an entry corresponding to the identifier of the third standby node, and deletes the identifier of the to-be-deleted storage unit from the entry corresponding to the identifier of the third standby node.

Further, in this embodiment of the present disclosure, when storage space of the local cache of the standby node is insufficient, the standby node eliminates some storage units from the local cache based on a pre-configured elimination policy, and the elimination indicates that data in the storage unit is deleted to obtain storage space. The pre-configured elimination policy may be a storage-time-based policy. In a specific implementation, when the standby node detects that the storage space of the local cache is insufficient (for example, detects that a storage volume is greater than a preset threshold), the standby node detects a storage time of each storage unit in the local cache, and eliminates a storage unit whose storage time is greater than a preset duration. The pre-configured elimination policy may be a priority-based policy. In another specific implementation, when the standby node detects that the storage space of the local cache is insufficient, the standby node detects a priority of each storage unit in the local cache, and eliminates a storage unit whose priority is less than a preset level.

It can be understood that if the standby node eliminates a storage unit from the local cache, a quantity of storage units in the local cache changes. In this case, to notify the control node of a changing status of the quantity of storage units in the local cache of the standby node, the standby node correspondingly generates a deletion request, and sends the deletion request to the control node. The deletion request includes an identifier of the standby node and an identifier of a to-be-deleted storage unit (that is, an identifier of the eliminated storage unit). After receiving the deletion request, the control node determines, according to the identifier of the standby node, a mapping table entry corresponding to the identifier of the standby node, and deletes the identifier of the to-be-deleted storage unit from the entry corresponding to the identifier of the standby node to implement mapping table updating.

It can be learned that after a mapping table update mechanism is introduced, the standby node may feedback the registration/deletion request to the control node according to a specific status of the standby node. The control node updates the mapping table such that the control node learns of a latest state of the standby node in the database system in order to ensure that the database system is more practicable and reliable.

With reference to the first aspect, in some possible implementations, the control node is multiple physical servers, different physical servers are connected to different standby node groups, each standby node group includes one or more standby nodes, each standby node is provided with a member list, and the member list records an identifier of a physical server corresponding to a standby node group in which the standby node exists.

In this implementation, the primary node sends the operation log to each of the multiple physical servers. The standby node sends the registration request to the physical server according to the identifier of the corresponding physical server. The standby node sends the deletion request to the physical server according to the identifier of the corresponding physical server.

In a specific embodiment, for example, when a large quantity of redo logs are generated because the primary node frequently performs a read/write transaction or when there are a large quantity of standby nodes, multiple control nodes may be disposed in the new database system (that is, the multiple physical servers are disposed), and each control node may manage different standby node groups. When committing a read/write transaction, the primary node distributes the operation log to each of the multiple control nodes. After receiving the operation log, the control node manages the operation log, and sends a required operation record (a redo log) to each standby node in a standby node group managed by the control node. Then each standby node updates a corresponding page based on the required operation record. Therefore, pages related to the operation log can be consistent in the primary node and the standby node in the database system. The multiple control nodes are introduced in order to reduce the CPU consumption of the primary node/standby node and the network resource waste more effectively.

According to a second aspect, an embodiment of the present disclosure provides a control node, including a storage, a processor coupled to the storage, a transmitter, and a receiver, where the transmitter is configured to send data to the outside, the receiver is configured to receive data sent by the outside, the storage is configured to store implementation code and related data (such as an operation log) in the method described in the first aspect, and the processor is configured to execute the program code stored in the storage, that is, execute the method described in the first aspect.

According to a third aspect, an embodiment of the present disclosure provides still another control node, including an obtaining unit, a processing unit, and a transmission unit. These function units are configured to execute the method described in the first aspect.

According to a fourth aspect, an embodiment of the present disclosure provides a database system, and the database system includes one primary node, at least one standby node, a storage device, and a control node. The primary node is separately connected to the control node and the storage device, and the standby node is separately connected to the control node and the storage device. The primary node is configured to send an operation log to the control node, where the operation log includes at least one operation record, each operation record corresponds to one storage unit, and each operation record indicates a record of performing, by the primary node, a write operation on a local cache of the primary node or a storage unit in the storage device. The control node is configured to receive the operation log, determine, for a first standby node, a first storage unit set in the first standby node, and determine a second storage unit set corresponding to the at least one operation record, generate a storage unit intersection set according to a storage unit that exists in both the first storage unit set and the second storage unit set, and obtain an operation record corresponding to the storage unit intersection set from the operation log, and send the corresponding operation record to a first standby node, where the first standby node is any one of the at least one standby node. The first standby node is configured to receive the corresponding operation record, and perform a corresponding operation on a storage unit, in a local cache, that is indicated by the corresponding operation record.

With reference to the fourth aspect, in some possible implementations, the storage unit is a page.

With reference to the fourth aspect, in some possible implementations, determining, by the control node, a first storage unit set in the first standby node includes determining, by the control node, the first storage unit set in the first standby node according to a mapping table, where the mapping table includes at least one entry, each entry includes an identifier of a standby node and identifiers of storage units corresponding to a local cache of the standby node, and one of the entries includes an identifier of the first standby node and identifiers of storage units corresponding to a local cache of the first standby node.

With reference to the fourth aspect, in some possible implementations, the database system further includes a second standby node. The second standby node is configured to determine whether the local cache includes a storage unit corresponding to the read operation instruction when receiving a read operation instruction, and if the local cache does not include the storage unit corresponding to the read operation instruction, read the corresponding storage unit from the storage device and write the corresponding storage unit to the local cache, and send a registration request to the control node, where the registration request includes an identifier of the second standby node and an identifier of the corresponding storage unit, and the second standby node is any one of the at least one standby node. The control node is further configured to receive the registration request, determine, according to the identifier of the second standby node, an entry corresponding to the identifier of the second standby node, and add the identifier of the corresponding storage unit to the entry corresponding to the identifier of the second standby node.

With reference to the fourth aspect, in some possible implementations, the control node includes multiple physical servers, the second standby node is provided with a member list, and the member list records an identifier of a physical server in the multiple physical servers. The second standby node sends the registration request to the physical server according to the identifier of the physical server.

With reference to the fourth aspect, in some possible implementations, the database system further includes a third standby node. The third standby node is configured to determine a to-be-deleted storage unit, and send a deletion request to the control node if a storage unit in the local cache needs to be deleted, where the deletion request includes an identifier of the third standby node and an identifier of the to-be-deleted storage unit, and the third standby node is any one of the at least one standby node. The control node is further configured to receive the deletion request, determine, according to the identifier of the third standby node, an entry corresponding to the identifier of the third standby node, and delete the identifier of the to-be-deleted storage unit from the entry corresponding to the identifier of the third standby node.

With reference to the fourth aspect, in some possible implementations, the control node includes multiple physical servers, the third standby node is provided with a member list, and the member list records an identifier of a physical server in the multiple physical servers. The third standby node sends the deletion request to the physical server according to the identifier of the physical server.

It should be noted that the first standby node, the second standby node, and the third standby node may be a same standby node, or may be different standby nodes.

According to a fifth aspect, an embodiment of the present disclosure provides a database system, where the database system includes one primary node, at least one standby node, and a storage device, the primary node is separately connected to the at least one standby node and the storage device, the at least one standby node is connected to the storage device, and the primary node and the standby node share data in the storage device, where the primary node is configured to generate an operation log, where the operation log includes at least one operation record, and each operation record indicates a record of performing, by the primary node, a write operation on a local cache of the primary node or a storage unit in the storage device, and further configured to determine a first storage unit set corresponding to a first standby node, and determine a second storage unit set corresponding to the at least one operation record, where the first standby node is one of the at least one standby node, a local cache of the first standby node stores a storage unit corresponding to the first storage unit set, and the corresponding storage unit is read from the storage device, and obtain an operation record corresponding to a storage unit intersection set from the operation log, and send the corresponding operation record to the first standby node, where the storage unit intersection set is an intersection set of storage units in the first storage unit set and the second storage unit set, and the first standby node is configured to receive the corresponding operation record, and perform a corresponding operation on a storage unit, in a local cache, that is indicated by the corresponding operation record.

With reference to the fifth aspect, in some possible implementations, determining, by the primary node, a first storage unit set in the first standby node includes determining, by the primary node, the first storage unit set in the first standby node according to a mapping table, where the mapping table includes at least one entry, each entry includes an identifier of a standby node and identifiers of storage units corresponding to a local cache of the standby node, and one of the entries includes an identifier of the first standby node and identifiers of storage units corresponding to a local cache of the first standby node.

With reference to the fifth aspect, in some possible implementations, that the mapping table includes at least one entry is as follows.

When there are at least two standby nodes and storage units corresponding to local caches of different standby nodes are inconsistent, the mapping table includes at least two entries, and identifiers of storage units corresponding to different entries are inconsistent.

With reference to the fifth aspect, in some possible implementations, the storage unit is a page.

With reference to the fifth aspect, in some possible implementations, the database system further includes a second standby node. The second standby node is configured to determine whether the local cache includes a storage unit corresponding to the read operation instruction when receiving a read operation instruction, and if the local cache does not include the storage unit corresponding to the read operation instruction, read the corresponding storage unit from the storage device and write the corresponding storage unit to the local cache, and send a registration request to the primary node, where the registration request includes an identifier of the second standby node and an identifier of the corresponding storage unit, and the second standby node is any one of the at least one standby node. The primary node is further configured to receive the registration request, determine, according to the identifier of the second standby node, an entry corresponding to the identifier of the second standby node, and add the identifier of the corresponding storage unit to the entry corresponding to the identifier of the second standby node.

With reference to the fifth aspect, in some possible implementations, the database system further includes a third standby node. The third standby node is configured to determine a to-be-deleted storage unit, and send a deletion request to the primary node if a storage unit in the local cache needs to be deleted, where the deletion request includes an identifier of the third standby node and an identifier of the to-be-deleted storage unit, and the third standby node is any one of the at least one standby node. The primary node is further configured to receive the deletion request, determine, according to the identifier of the third standby node, an entry corresponding to the identifier of the third standby node, and delete the identifier of the to-be-deleted storage unit from the entry corresponding to the identifier of the third standby node.

It should be noted that the first standby node, the second standby node, and the third standby node may be a same standby node, or may be different standby nodes.

According to a sixth aspect, an embodiment of the present disclosure provides a computer readable storage medium, and the computer readable storage medium stores an instruction (implementation code). When the computer readable storage medium runs on a computer, the computer may execute the method in the first aspect based on the instruction.

According to a seventh aspect, an embodiment of the present disclosure provides a computer program product including an instruction. When the computer readable storage medium runs on a computer, the computer may execute the method in the first aspect based on the instruction.

It can be learned that according to solutions in the embodiments of the present disclosure, in the database system, when performing the read/write transaction, the primary node modifies the local cache of the primary node or a page in the storage device, and sends the operation log to the control node after generating the corresponding operation log (for example, all redo logs). The control node may obtain, by querying the mapping table, an operation record (for example, a required redo log) required by each standby node in the database system, and send the operation record to a corresponding standby node such that the standby node updates the storage unit in the local cache. In this process, the standby node may send the registration request or the deletion request to the control node according to a page change in the memory of the standby node such that the control node updates the mapping table. A mapping table update mechanism is introduced such that the database system can be more practicable and reliable. According to the embodiments of the present disclosure, the control node can pertinently send a required operation record (for example, a required redo log) to the standby node. This avoids transmission of an unrelated operation record (for example, an unrelated redo log) in a communications network, effectively reduces operation records in the communications network, and saves network resources. The primary node needs only to send the operation log to the control node. After the control node processes the operation log, all operation records received by the standby node are operation records required by the standby node. Therefore, a discard operation performed for the unrelated operation record is avoided. Implementation of the embodiments of the present disclosure can effectively reduce the CPU consumption of the primary node/standby node.

BRIEF DESCRIPTION OF DRAWINGS

To describe the technical solutions in embodiments of the present disclosure more clearly, the following describes the accompanying drawings required for describing the embodiments of the present disclosure.

DESCRIPTION OF EMBODIMENTS

The following describes the embodiments of the present disclosure with reference to the accompanying drawings in the embodiments of the present disclosure.

Figure 1A:
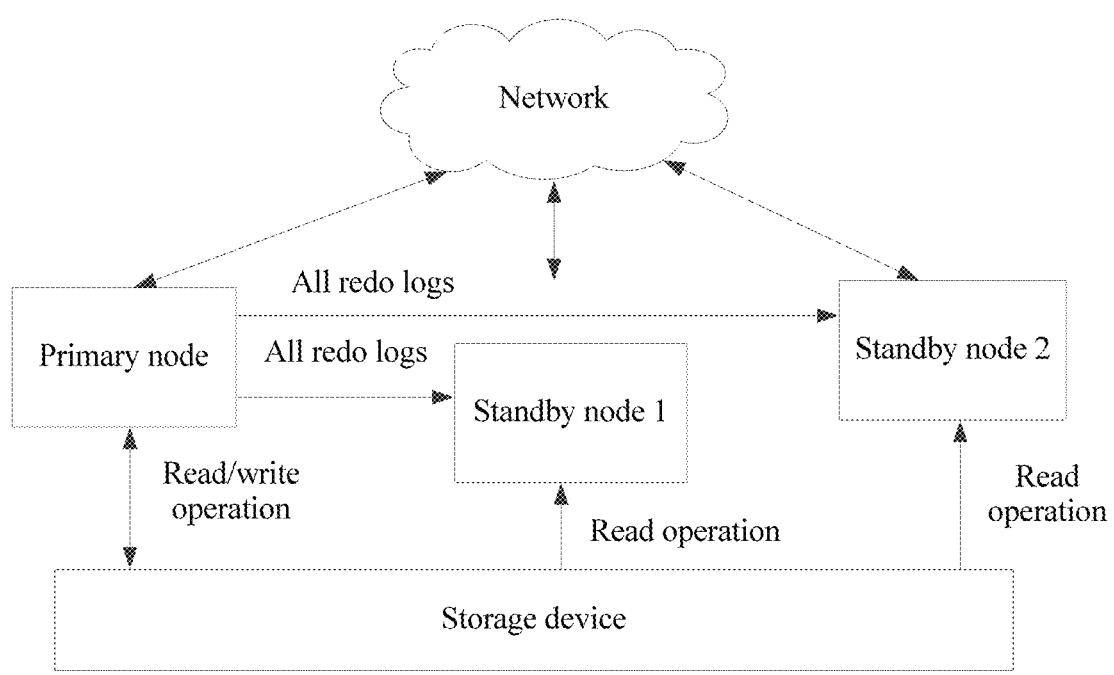
FIG. 1A is a schematic structural diagram of a database system.

First, a cluster system based on a one-read multi-write shared storage architecture is described. Referring to FIG. 1A, FIG. 1A is a schematic structural diagram of a database system. As shown in FIG. 1A, the database system includes one primary node, at least one standby node (a standby node 1 and a standby node 2 in the figure), and a storage device. The primary node is separately connected to the standby node and the storage device, and the standby node is also connected to the storage device. The primary node and the standby node may be connected to the Internet.

In the database system, database instances (database instance) of the primary node and the standby node share a database in a same storage medium. However, only the primary node can perform writing to the database and update the database, and all the standby nodes can only perform reading in the database. When receiving a write operation instruction sent by a user and performing a read/write transaction, the primary node first determines whether a database table related to the read/write transaction is in a local cache (such as a memory of the primary node), and if the related table is not in the local cache, reads a related page from the storage device and writes the related page to the local cache. The related page records the table. Then, the primary node performs a write operation on the table (for example, performs insertion and update operations on the table), modifies the related page in the local cache, and records a redo log of page modification. When committing the transaction, the primary node sends all redo logs related to the transaction to all standby nodes in the database system. After the standby node receives the redo log, if a page related to the redo log is in a local cache of the standby node (such as a memory of the standby node), the standby node applies the redo log to the related page in the local cache of the standby node, and the related page is correspondingly updated, or if a page related to the redo log is not in a local cache of the standby node, the redo log is discarded.

In the foregoing database system, although the primary node and the standby node are connected to a same storage device, the user may read some pages from the storage device and write the pages to the memory of the primary node by controlling the primary node, and the user may read some other pages from the storage device and write the pages to the memory of the standby node by controlling the standby node. Consequently, the pages in the memory of the primary node may be inconsistent with the pages in the memory of the standby node, and pages in different standby nodes may also be inconsistent. When the primary node performs a read/write transaction and correspondingly modifies a page in the memory of the primary node, to enable pages in memories of all standby nodes to remain a latest state, the primary node broadcasts all redo logs related to a current transaction to all the standby nodes when committing the transaction. That is, in all the redo logs received by the standby node, some redo logs are unrelated to the standby node, and the standby node needs to discard these redo logs. This causes CPU consumption and network resource waste.

Figure 1B:
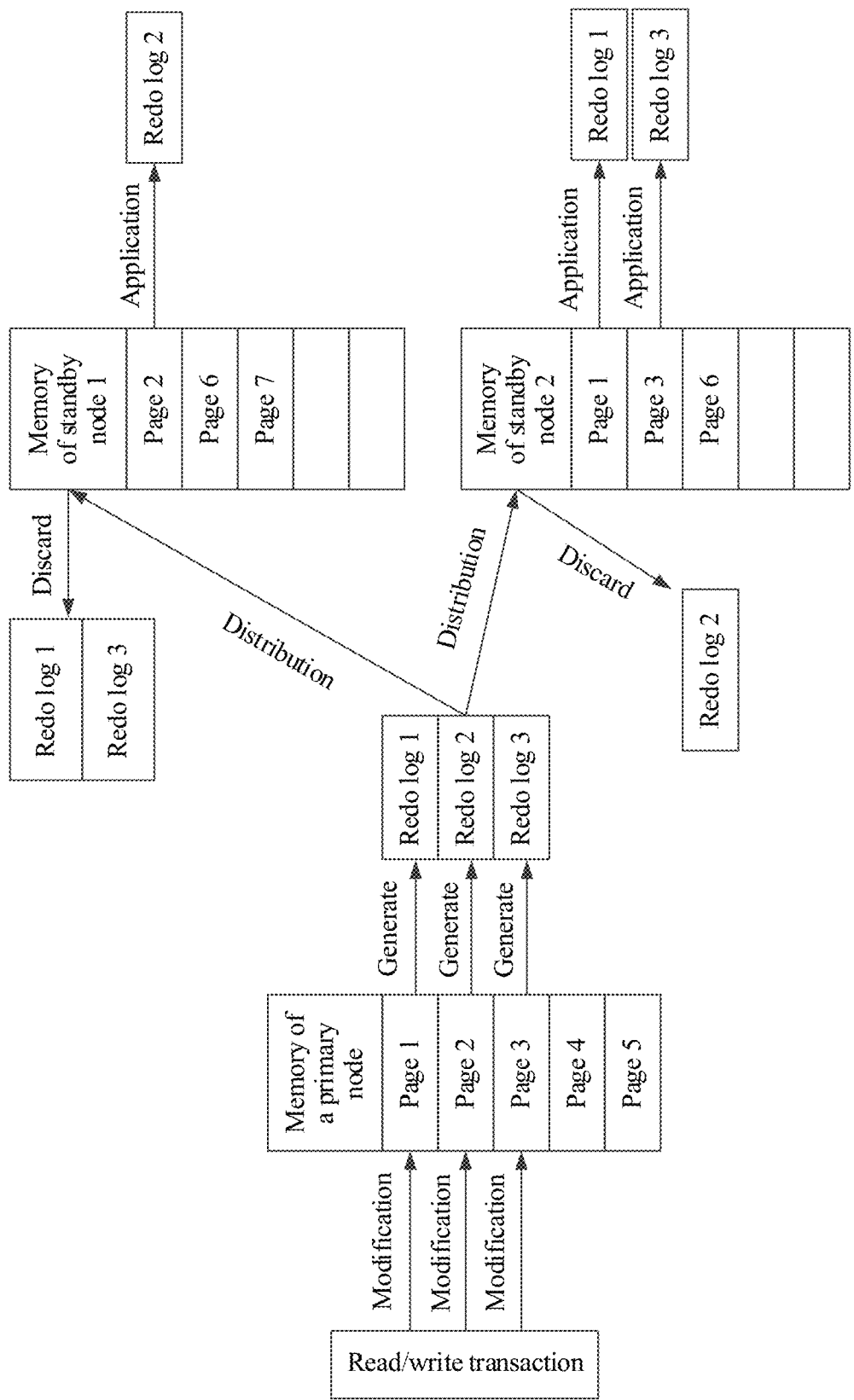
FIG. 1B is a schematic diagram of a redo log processing procedure in a database system.

For example, referring to FIG. 1B, FIG. 1B is a schematic diagram of a redo log processing procedure in a database system. As shown in FIG. 1B, it is assumed that in an application scenario, the memory of the primary node includes five pages: a page 1, a page 2, a page 3, a page 4, and a page 5, a memory of a standby node 1 includes three pages: the page 2, a page 6, and a page 7, and a memory of a standby node 2 includes three pages: the page 1, the page 3, and the page 6. When performing a read/write transaction, the primary node modifies three pages: the page 1, the page 2, and the page 3, and correspondingly generates redo logs for the three pages: a redo log 1, a redo log 2, and a redo log 3. When committing the transaction, the primary node separately sends the redo logs for the three pages to the standby node 1 and the standby node 2.

When the standby node 1 receives the redo logs for the three pages: the page 1, the page 2, and the page 3, the standby node 1 finds that the memory of the standby node 1 does not include the page 1 and the page 3, and therefore discards the redo log 1 and the redo log 3 and applies only the redo log 2 to the page 2.

When the standby node 2 receives the redo logs for the three pages: the page 1, the page 2, and the page 3, the standby node 2 finds that the memory of the standby node 2 does not include the page 2, and therefore discards the redo log 2, applies the redo log 1 to the page 1, and applies the redo log 3 to the page 3.

It can be learned from the foregoing process that the redo log 1 and the redo log 3 are unrelated to the standby node 1, and the redo log 2 is unrelated to the standby node 2. Consequently, network resources are wasted because the foregoing unrelated redo logs are transmitted in a broadcast process. In addition, extra CPU consumption of the primary node is caused because the primary node separately sends an unrelated redo log to the standby node 1 and the standby node 2, and extra CPU consumption of the standby node 1 and the standby node 2 is also caused because the standby node 1 and the standby node 2 need to discard respective unrelated redo logs. Obviously, when a large quantity of redo logs are generated because the primary node frequently performs the read/write transaction, or when there are a large quantity of standby nodes, both the primary node and the standby node in the cluster system process a large quantity of unrelated redo logs. Consequently, massive network resources are wasted, and CPUs of the primary node and the standby node are excessively consumed.

Figure 2:
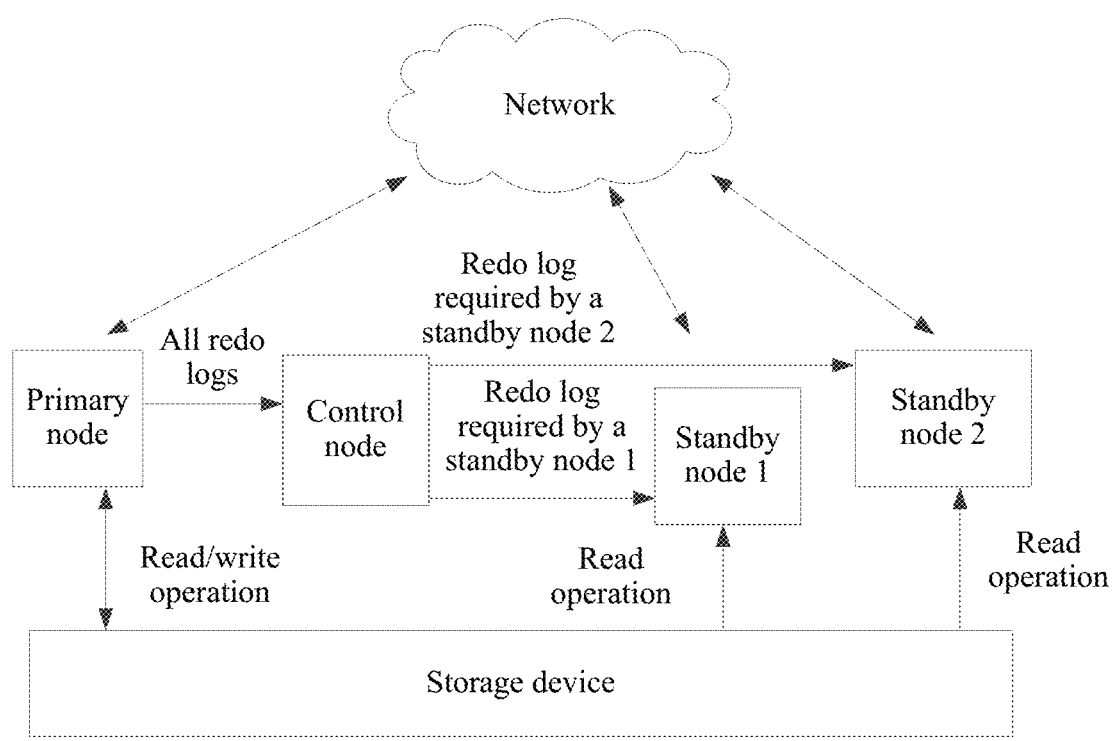
FIG. 2 is a schematic structural diagram of a database system according to an embodiment of the present disclosure.

An embodiment of the present disclosure provides a new database system. This can rectify a defect in other approaches, implement effective redo log management, and reduce unrelated redo log transmission between a primary node and a standby node in order to reduce CPU consumption of the primary node/standby node and network resource waste. Referring to FIG. 2, differences between this database system and the database system in the other approaches are as follows.

(1) A control node is configured in the database system. The control node may be configured to obtain an operation log. The operation log includes one or more operation records. Each operation record corresponds to one storage unit, and each operation record indicates a record of performing, by the primary node, a write operation on a storage unit in a storage device. In a specific embodiment, the operation log is a set of all redo logs, and the storage unit is a page. Therefore, each operation record is a redo log corresponding to a page. The primary node performs a read/write transaction, modifies a related page in a local cache, and records a redo log of page modification. Each redo log is an operation record corresponding to a page. When committing the transaction, the primary node sends all the redo logs (the operation log) related to the transaction to the control node. After receiving the operation log, the control node manages the operation log, determines a page in each standby node in the database system, and then sends, to each standby node, a redo log (an operation record) required by the standby node. For example, for the application scenario described in FIG. 1B, the memory of the primary node includes the five pages: the page 1, the page 2, the page 3, the page 4, and the page 5, the memory of the standby node 1 includes the three pages: the page 2, the page 6, and the page 7, and the memory of the standby node 2 includes the three pages: the page 1, the page 3, and the page 6. When performing the read/write transaction, the primary node modifies the three pages: the page 1, the page 2, and the page 3, and correspondingly generates redo logs for the three pages: the redo log 1, the redo log 2, and the redo log 3. When committing the transaction, the primary node sends, to the control node, an operation log that includes the redo logs for the three pages. After receiving the operation log, the control node separately determines pages in the standby node 1 and the standby node 2, and determines, based on the operation log, that an operation record required by the standby node 1 is the redo log 2, and operation records required by the standby node 2 are the redo log 1 and the redo log 3. Then the control node sends the redo log 2 to the standby node 1, and sends the redo log 1 and the redo log 3 to the standby node 2. It can be learned that the control node pertinently sends a required redo log to the standby node. This avoids transmission of an unrelated redo log in a communications network, effectively reduces redo logs in the communications network, and saves network resources.

(2) Corresponding policies are configured on the primary node and the standby node. When the primary node needs to instruct the standby node to update a corresponding page, the primary node does not need to broadcast an operation log to the standby node, and needs only to send the operation log to a control node such that CPU consumption of the primary node can be effectively reduced. The control node transmits, to each standby node in a unicast manner, an operation record (a redo log) required by the standby node. After receiving the required operation record (the redo log), the standby node applies the operation record (the redo log) to a corresponding page to update the page in order to ensure synchronization between the page in the standby node and that in the primary node. It can be learned that a discard operation performed by the standby node for an unrelated redo log is omitted because the standby node does not receive an unrelated redo log such that CPU consumption of the standby node can be effectively reduced.

In a specific embodiment, there may be one or more control nodes. For example, when a large quantity of redo logs are generated because the primary node frequently performs a read/write transaction, or when there are a large quantity of standby nodes, multiple control nodes may be configured in the new database system, and each control node may manage different standby node groups. When committing a read/write transaction, the primary node distributes the operation log to each of the multiple control nodes. After receiving the operation log, the control node manages the operation log, and sends a required operation record (a redo log) to each standby node in a standby node group managed by the control node. Then each standby node updates a corresponding page based on the required operation record. Therefore, pages related to the operation log can be consistent in the primary node and the standby node in the database system. The multiple control nodes are introduced in order to reduce the CPU consumption of the primary node/standby node and the network resource waste more effectively.

It should be noted that in the database system described in this embodiment of the present disclosure, a storage unit is used to describe database data in a specific storage area, and the storage unit is fixed-size storage space in which data is recorded. In a specific implementation, the storage unit may be a page, or may be data storage space defined in another form, such as a block or a sector. It should be noted that in the following embodiments of the present disclosure, to describe the solutions in detail, a page is used to describe the technical solutions in the embodiments of the present disclosure for the storage unit, and an implementation in which the storage unit is defined is the other form (block, sector, or the like) is similar to an implementation for the page, and details are not repeatedly described. It should be further noted that the storage unit may refer to a page, or may be a combination of multiple pages in a specific scenario. That the storage unit is described using the page in the present disclosure is merely used to explain the technical solutions in the embodiments of the present disclosure, and should not be intended to limit the scope of the present disclosure.

Figure 3A:
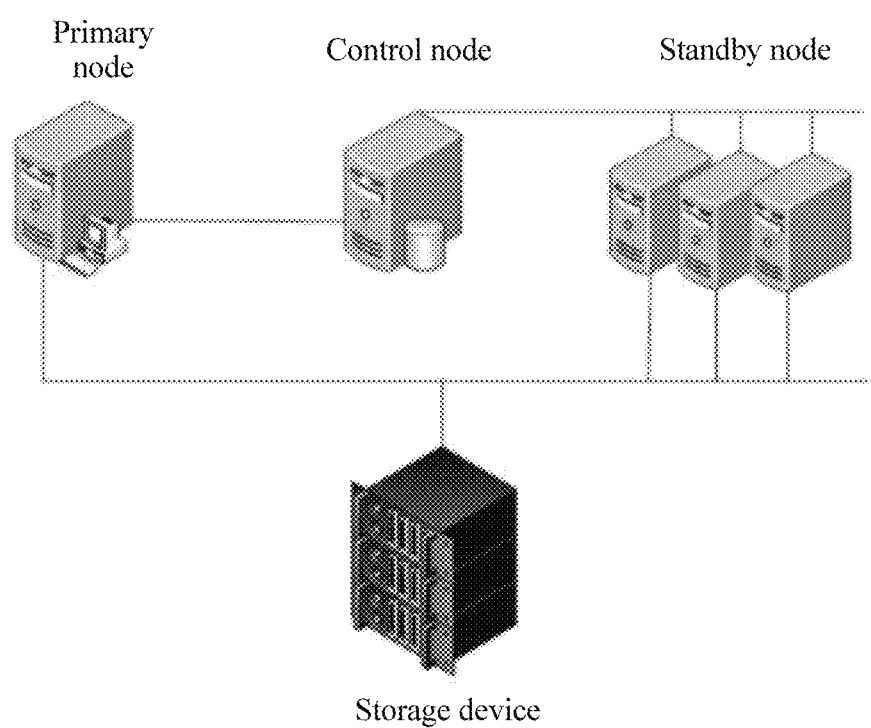
FIG. 3A is a schematic diagram of a database system according to an embodiment of the present disclosure.

Refer to FIG. 3A. In an application scenario, a database system provided in an embodiment of the present disclosure includes one primary node, at least one standby node (there are multiple standby nodes in the figure), a storage device, and a control node. The primary node is separately connected to the control node and the storage device, and the standby node is separately connected to the control node and the storage device. The primary node and the standby node may be communicatively connected to the outside (for example, may be connected to the Internet).

The primary node is configured to send an operation log to the control node, where the operation log includes at least one operation record, each operation record corresponds to one storage unit, and each operation record indicates a record of performing, by the primary node, a write operation on a local cache of the primary node or a storage unit in the storage device.

The control node is configured to receive the operation log, determine, for a first standby node, a first storage unit set in the first standby node, and determine a second storage unit set corresponding to the at least one operation record, generate a storage unit intersection set according to a storage unit that exists in both the first storage unit set and the second storage unit set, and obtain an operation record corresponding to the storage unit intersection set from the operation log, and send the corresponding operation record to the first standby node, where the first standby node is any one of the at least one standby node.

The first standby node is configured to receive the corresponding operation record, and perform a corresponding operation on a storage unit, in a local cache, that is indicated by the corresponding operation record.

In a specific implementation, determining, by the control node, a first storage unit set in the first standby node includes determining, by the control node, the first storage unit set in the first standby node according to a mapping table, where the mapping table includes at least one entry, each entry includes an identifier of a standby node and identifiers of storage units corresponding to a local cache of the standby node, and one of the entries includes an identifier of the first standby node and identifiers of storage units corresponding to a local cache of the first standby node.

In a specific embodiment, the database system further includes a second standby node. The second standby node is configured to determine whether the local cache includes a storage unit corresponding to the read operation instruction when receiving a read operation instruction, and if the local cache does not include the storage unit corresponding to the read operation instruction, read the corresponding storage unit from the storage device and write the corresponding storage unit to the local cache, and send a registration request to the control node, where the registration request includes an identifier of the second standby node and an identifier of the corresponding storage unit, and the second standby node is any one of the at least one standby node.

The control node is further configured to receive the registration request, determine, according to the identifier of the second standby node, an entry corresponding to the identifier of the second standby node, and add the identifier of the corresponding storage unit to the entry corresponding to the identifier of the second standby node.

In a specific embodiment, the database system further includes a third standby node. The third standby node is configured to determine a to-be-deleted storage unit if a storage unit in the local cache needs to be deleted, and send a deletion request to the control node, where the deletion request includes an identifier of the third standby node and an identifier of the to-be-deleted storage unit, and the third standby node is any one of the at least one standby node.

The control node is further configured to receive the deletion request, determine, according to the identifier of the third standby node, an entry corresponding to the identifier of the third standby node, and delete the identifier of the to-be-deleted storage unit from the entry corresponding to the identifier of the third standby node.

Figure 3B:
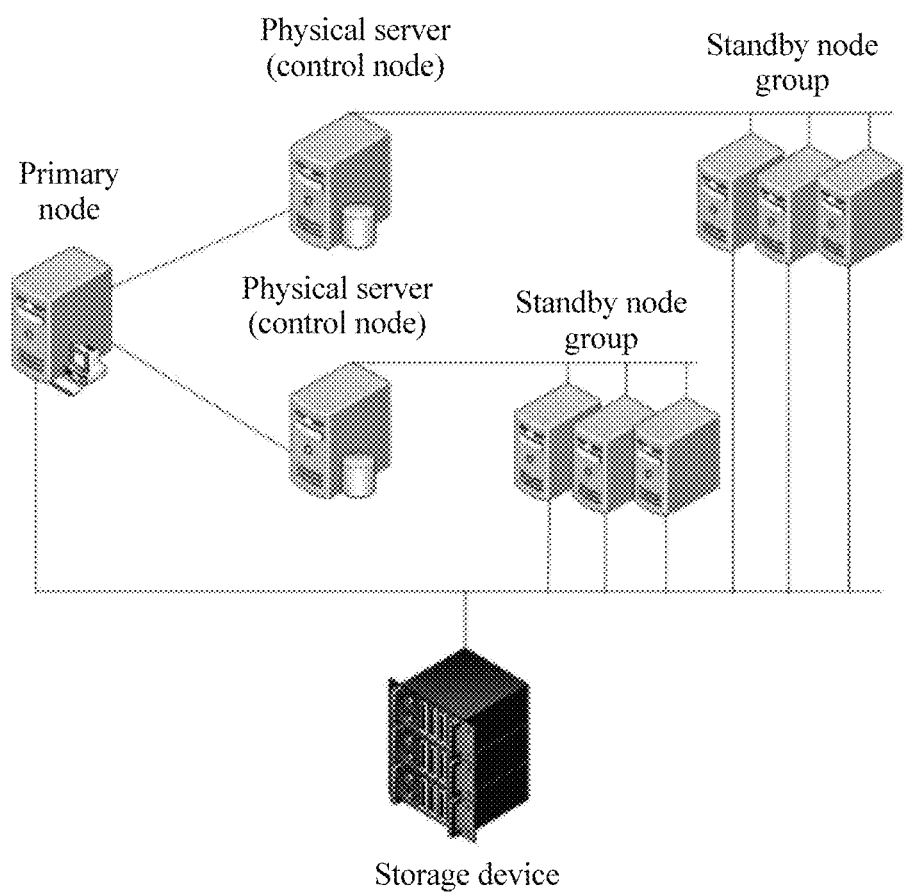
FIG. 3B is a schematic diagram of another database system according to an embodiment of the present disclosure.

Refer to FIG. 3B. In another application scenario, a database system provided in an embodiment of the present disclosure includes one primary node, multiple standby node groups, a storage device, and a control node. The control node is multiple physical servers. Different physical servers are connected to different standby node groups. Each standby node group includes one or more standby nodes. The primary node is separately connected to the multiple physical servers and the storage device, and the standby node is separately connected to the storage device and a corresponding physical server. The primary node and the standby node may be communicatively connected to the outside (for example, may be connected to the Internet).

That is, each physical server may have a function of the control node in FIG. 3A. A difference lies in that the control node in FIG. 3A manages all standby nodes in the database system, but each physical server in FIG. 3B manages a corresponding standby node group. In a specific embodiment, a mapping table that is preset by the control node in FIG. 3A includes information related to all the standby nodes (entries of all the standby nodes), but a mapping table that is preset by each physical server in FIG. 3B includes information related to a standby node in the corresponding standby node group (an entry of the standby node in the standby node group).

In this implementation, the primary node is configured to send an operation log to each of the multiple physical servers.

To manage a standby node group by each physical server, information configuration may be performed on each standby node. In a specific implementation, each standby node is provided with a member list, and the member list records an identifier of a physical server corresponding to a standby node group in which the standby node exists.

In a specific implementation, the standby node may send a registration request to the physical server according to the identifier of the corresponding physical server.

In a specific implementation, the standby node may send a deletion request to the physical server according to the identifier of the corresponding physical server.

In the foregoing two adduced database systems, the control node is an independent device in the database system. However, it should be noted that in a specific implementation of the embodiment of the present disclosure, the control node is not necessarily an independent device. In this case, in an application scenario, the control node may be built in the primary node, or may exist as a function module of the primary node. In another application scenario, the control node may be built in a standby node, or may exist as a function module of a standby node.

Figure 3C:
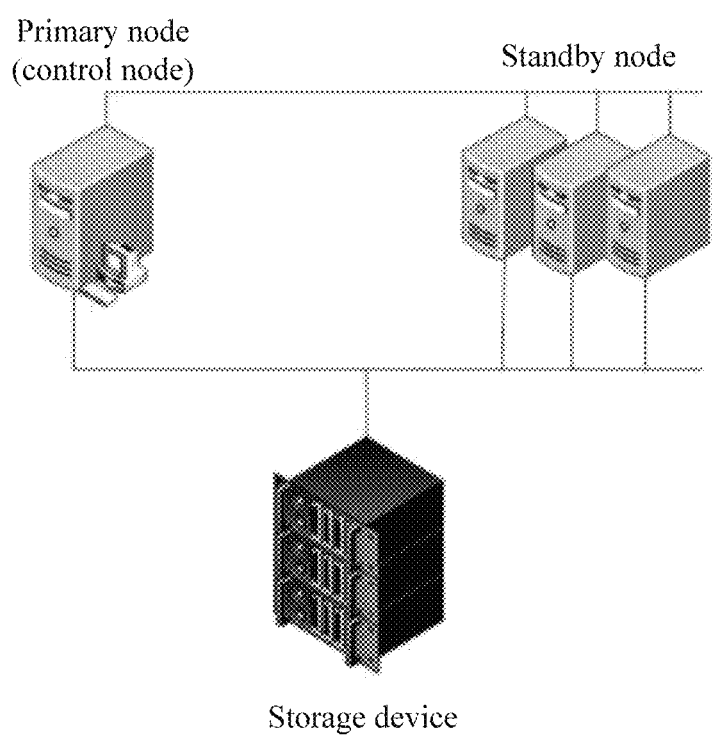
FIG. 3C is a schematic diagram of still another database system according to an embodiment of the present disclosure.

For example, when the control node is built in the primary node, or exists as a function module of the primary node, refer to FIG. 3C. In an application scenario provided in this embodiment of the present disclosure, the database system includes one primary node, at least one standby node, and a storage device. The primary node is separately connected to the at least one standby node and the storage device, and the at least one standby node is connected to the storage device. The primary node and the standby node share data in the storage device. The primary node and the standby node may be communicatively connected to the outside (for example, may be connected to the Internet).

The primary node is configured to generate an operation log, where the operation log includes at least one operation record, and each operation record indicates a record of performing, by the primary node, a write operation on a local cache of the primary node or a storage unit in the storage device, and further configured to determine a first storage unit set corresponding to a first standby node, and determine a second storage unit set corresponding to the at least one operation record, where the first standby node is one of the at least one standby node, a local cache of the first standby node stores a storage unit corresponding to the first storage unit set, and the corresponding storage unit is read from the storage device, and obtain an operation record corresponding to a storage unit intersection set from the operation log, and send the corresponding operation record to the first standby node, where the storage unit intersection set is an intersection set of storage units in the first storage unit set and the second storage unit set.

The first standby node is configured to receive the corresponding operation record, and perform a corresponding operation on a storage unit, in a local cache, that is indicated by the corresponding operation record.

In a specific implementation, the primary node determines the first storage unit set in the first standby node according to a mapping table, where the mapping table includes at least one entry, each entry includes an identifier of a standby node and identifiers of storage units corresponding to a local cache of the standby node, and one of the entries includes an identifier of the first standby node and identifiers of storage units corresponding to a local cache of the first standby node.

In a specific implementation, if there are at least two standby nodes and storage units corresponding to local caches of different standby nodes are inconsistent, the mapping table includes at least two entries, and identifiers of storage units corresponding to different entries are inconsistent.

In a specific implementation, the standby node sends a registration request to the primary node.

In a specific implementation, the standby node sends a deletion request to the primary node.

That is, an original function of a primary node and a function of the control node may be integrated into a same server in order to form the primary node in this embodiment of the present disclosure. The primary node may not only generate the operation log, but also implement the function of the foregoing control node in order to manage an operation record in the operation log.

Figure 3D:
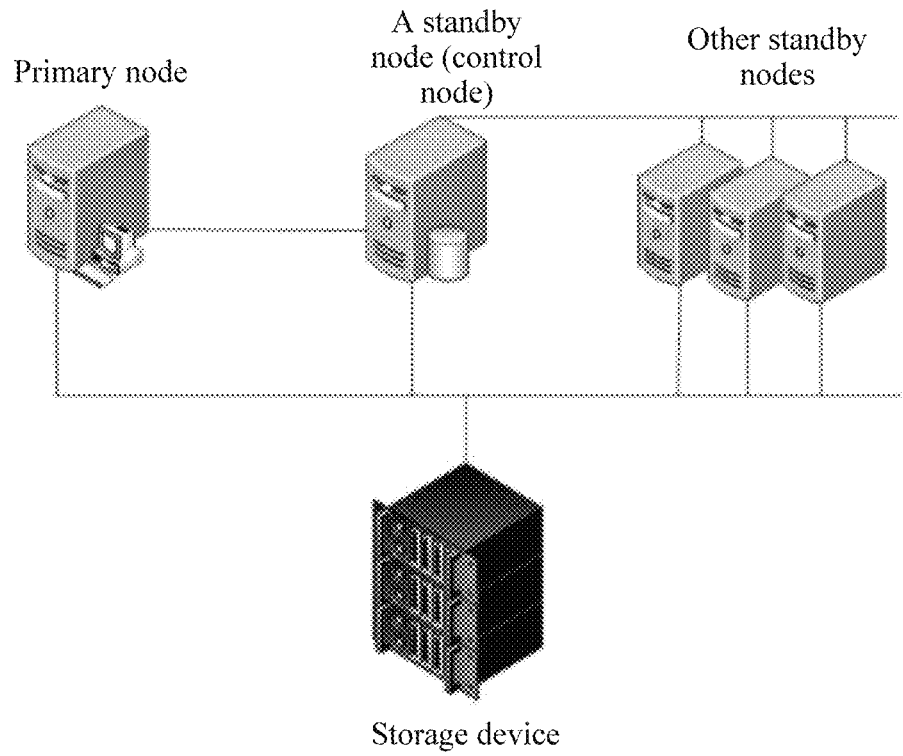
FIG. 3D is a schematic diagram of yet another database system according to an embodiment of the present disclosure.
Figure 4:
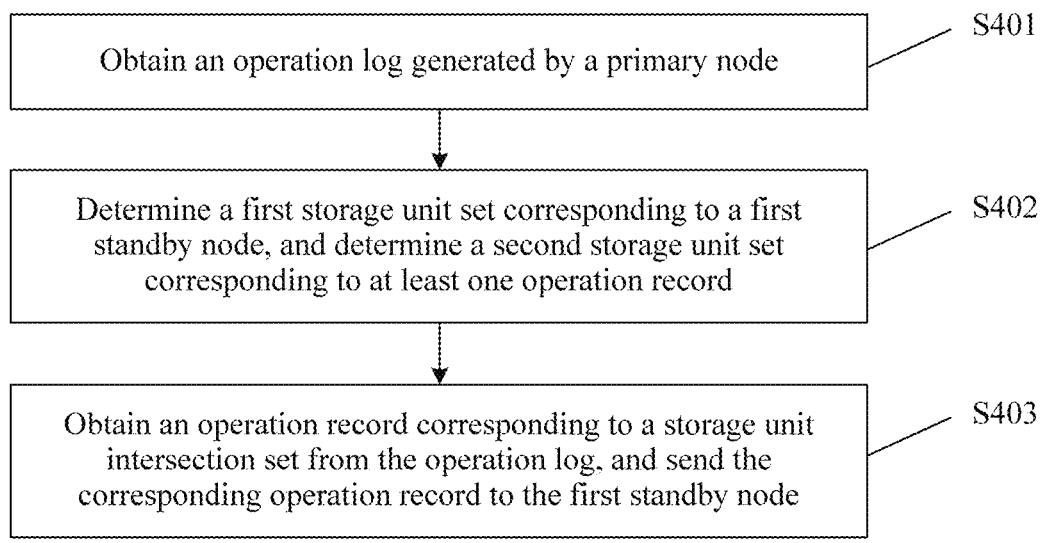
FIG. 4 is a schematic flowchart of a primary node-standby node data transmission method according to an embodiment of the present disclosure.

For another example, when the control node is built in a standby node, or exists as a function module of a standby node, refer to FIG. 3D. In an application scenario provided in this embodiment of the present disclosure, the database system includes one primary node, a standby node used as a control node, another standby node, and a storage device. The primary node is separately connected to the control node and the storage device, the other standby node is separately connected to the control node and the storage device, and the control node is connected to the storage device. The primary node, the control node, and the other standby node may be communicatively connected to the outside (for example, may be connected to the Internet).

That is, an original function of a standby node and a function of the control node may be integrated into a same server in order to form the standby node in this embodiment of the present disclosure. The control node may complete a job of the standby node (for example, reading a page from the storage device and writing the page), and may further implement the function of the foregoing control node in order to manage an operation record in the operation log. For specific implementations of the primary node, the standby node used as the control node, and the other standby node, refer to description in FIG. 3A, and details are not repeatedly described herein.

Based on a new database system, an embodiment of the present disclosure provides a primary node-standby node data transmission method. The method is applied to a control node in a database system with a one-read multi-write shared storage architecture, and is described from one aspect. The method includes the following steps.

Step S401: Obtain an operation log generated by a primary node.

In a specific application scenario, the control node may be an independent device (for example, an independent server), or may be a primary node, or may be a standby node.

When the control node is an independent device and the primary node performs a read/write transaction, the primary node performs a write operation on a local cache or a storage unit in a storage device, and correspondingly generates the operation log. The operation log includes at least one operation record, and each operation record indicates a record of performing, by the primary node, a write operation on a local cache of the primary node or a storage unit in the storage device. The primary node sends the operation log to the control node. Correspondingly, the control node obtains the operation log.

When the control node is the primary node, it can be understood that when performing a read/write transaction, the primary node directly obtains the operation log after generating the operation log.

When the control node is a standby node, and when the primary node performs a read/write transaction, the primary node sends the operation log to the standby node after generating the operation log. Correspondingly, the standby node obtains the operation log.

Step S402: Determine a first storage unit set corresponding to a first standby node, and determine a second storage unit set corresponding to at least one operation record.

When the control node is an independent device or a primary node, the first standby node is any one of the at least one standby node. When the control node is a standby node, the first standby node is any one of the at least one standby node other than the control node. The first standby node stores a storage unit corresponding to the first storage unit set, and the corresponding storage unit is read from the storage device.

In a specific embodiment, the control node determines the first storage unit set in the first standby node according to a mapping table, where the mapping table includes at least one entry, each entry includes an identifier of a standby node and identifiers of storage units corresponding to a local cache of the standby node, and one of the entries includes an identifier of the first standby node and identifiers of storage units corresponding to a local cache of the first standby node.

In a specific embodiment, when the control node is an independent device or a primary node, there are at least two standby nodes, and storage units corresponding to local caches of different standby nodes are inconsistent, the mapping table includes at least two entries, a quantity of the standby nodes is consistent with a quantity of the entries, but identifiers of storage units corresponding to different entries are inconsistent.

Step S403: Obtain an operation record corresponding to a storage unit intersection set from the operation log, and send the corresponding operation record to the first standby node.

The storage unit intersection set is an intersection set of storage units in the first storage unit set and the second storage unit set. After receiving the operation record, the first standby node performs a corresponding operation on a storage unit, in the local cache, that is indicated by the corresponding operation record. That is, all operation records received by the first standby node may be applied to the local cache in order to implement synchronization between a related page in the local cache and that in the primary node.

It can be learned that to implement the solution in this embodiment of the present disclosure, when performing a read/write transaction, the primary node modifies the local cache of the primary node or a page in the storage device, and generates the corresponding operation log. When the control node is an independent device or a standby node, the primary node sends the operation log to the control node. When the control node is the primary node, the control node correspondingly obtains the operation log. Then, the control node may obtain, by searching the mapping table, an operation record required by each standby node in the database system, and sends the operation record to a corresponding standby node such that the standby node updates a storage unit in the local cache. That is, according to this embodiment of the present disclosure, the control node can pertinently send the operation record to the standby node. This avoids transmission of an unrelated operation record in a communications network, effectively reduces operation records in the communications network, and saves network resources. When the control node is an independent device or a standby node, the primary node needs only to send the operation log (that is, all operation records) to the control node. After the control node processes the operation log, all operation records received by the standby node are operation records required by the standby node. This avoids a discard operation performed for the unrelated operation record. Implementation of this embodiment of the present disclosure can effectively reduce primary node/standby node CPU consumption.

Figure 5:
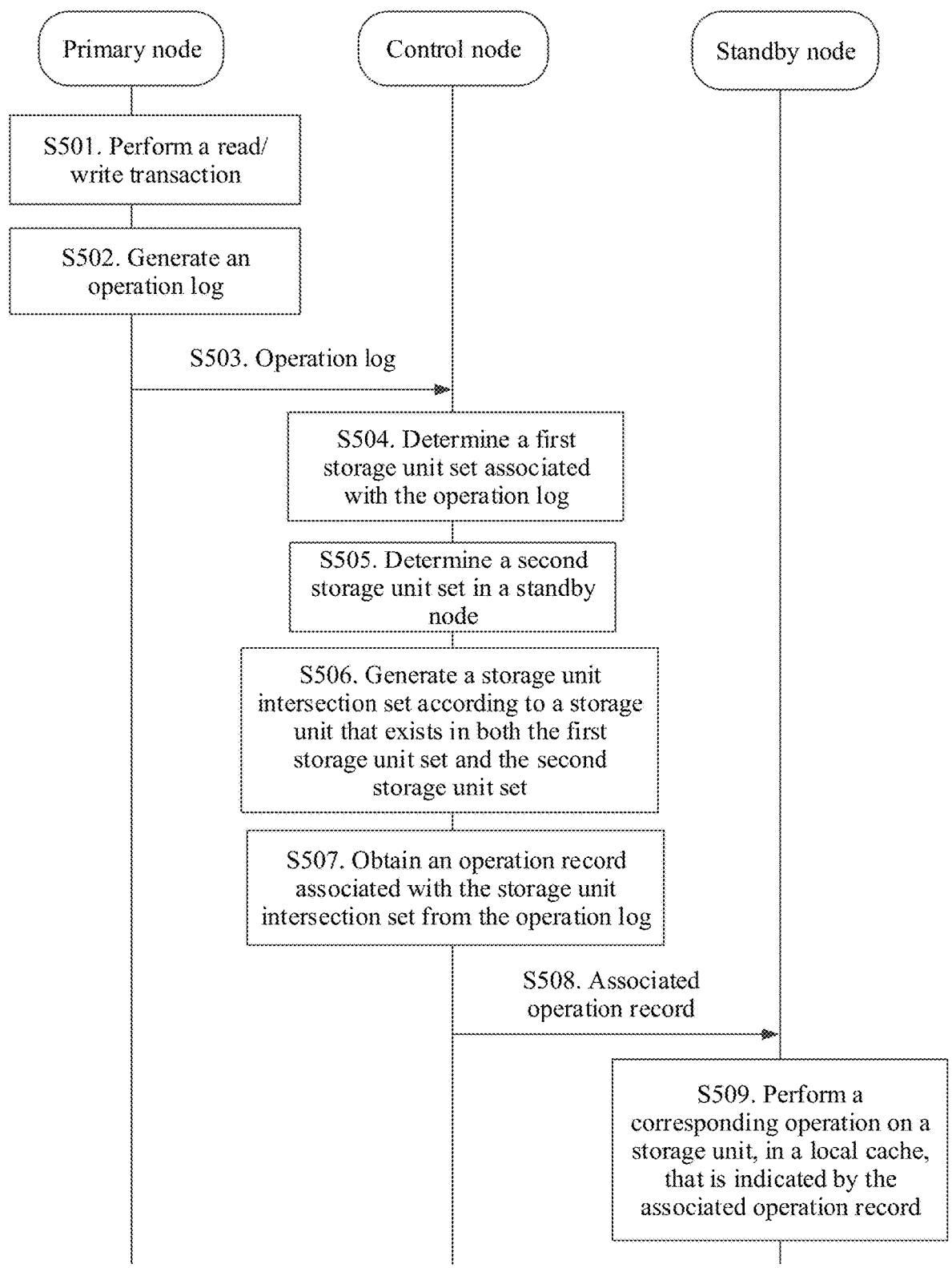
FIG. 5 is a schematic flowchart of another primary node-standby node data transmission method according to an embodiment of the present disclosure.

Based on the foregoing new database system, an embodiment of the present disclosure provides a primary node-standby node data transmission method, and the method is described from multiple aspects. In this embodiment of the present disclosure, a database system includes one primary node, at least one standby node, a storage device, and a control node. The primary node is separately connected to the control node and the storage device, and the standby node is separately connected to the control node and the storage device. Referring to FIG. 5, the method includes the following steps.

Step S501: The primary node performs a read/write transaction.

In the database system in this embodiment of the present disclosure, the primary node and the standby node are servers. The primary node and the standby node are connected to the storage device (that is, share a storage medium). The storage device may be an independent storage or a redundant array of independent disks (RAID), or may be a storage device in a storage area network (SAN). By sharing the storage medium, both the primary node and the standby node can use data in the storage device. For example, the storage device stores a database, and the data in the storage device is data in the database.

The primary node processes a transaction according to an operation instruction of a user (or user equipment), and the transaction may be a database transaction. For example, the database transaction is reading, editing, inserting, or updating a table in a database. After the primary node receives the operation instruction of the user (or the user equipment), the primary node first queries a local cache (such as a memory of the primary node), and determines whether the local cache includes database data indicated by the operation instruction. If the local cache includes the database data indicated by the operation instruction, the primary node directly processes the database data, or if the local cache does not include the database data indicated by the operation instruction, the primary node reads the database data from the storage device and writes the database data to the local cache, that is, the primary node reads and writes a copy of the database data stored in the storage device. Then the primary node processes the database data. After processing the database data in the local cache, the primary node may synchronize the processed database data to the storage device.

Step S502: The primary node generates an operation log.

In the database system described in this embodiment of the present disclosure, the primary node may perform a write operation on a page, and the standby node performs only a read operation on the page. When performing a read/write transaction, the primary node processes the database data. When the page is modified, the primary node records an operation record of page modification. Each operation record corresponds to one storage unit, and each operation record indicates a record of performing, by the primary node, a write operation on the local cache or a page in the storage device. When the primary node completes page modification and commits the transaction, the primary node summarizes all operation records to generate the operation log. In a specific implementation, the operation record is a redo log for a modified page, and the operation log is a set of redo logs for all modified pages.

In a specific implementation, page identifiers may be endowed for different pages, and the page identifier may be, for example, a page number. The operation log includes one or more operation records, and each operation record includes a corresponding page identifier.

Step S503: The primary node sends the operation log to the control node.

After the operation log is generated, to implement the technical solution described in this embodiment of the present disclosure, the primary node sends the operation log to the control node. In this embodiment of the present disclosure, the control node is an independent device, for example, an independent physical server. In a specific implementation, the primary node may be communicatively connected to the control node in a wired or wireless manner. Information about the control node (such as an address of the control node) is configured in the primary node. After generating the operation log, the primary node sends the operation log to the control node based on the information.

Step S504: The control node determines a first storage unit set associated with the operation log.

After the control node receives the operation log, to manage the operation log, the control node needs to determine a storage unit set corresponding to the operation log, that is, the control node needs to determine a storage unit corresponding to the operation log. Herein, the first storage unit set is used to be distinguished from the following storage unit set. The control node needs to determine a page corresponding to the operation log. In a specific implementation, the operation log includes all operation records, and each operation record includes a corresponding page identifier. Therefore, the control node may determine, using the page identifier, the page corresponding to the operation log.

Step S505: The control node determines a second storage unit set in a standby node.

After the control node receives the operation log, to manage the operation log, the control node further needs to determine a storage unit set in a standby node in the database system, that is, determine a storage unit in each standby node. Herein, the second storage unit set is used to be distinguished from the foregoing storage unit set. Further, the control node needs to determine a page in each standby node.

In a specific implementation, a mapping table is preset in the primary node. The mapping table includes at least one entry. Each entry may include an identifier of a standby node, identifiers of storage units in a local cache of the standby node, an address of the standby node, and the like. Further, the identifier of the standby node may be a standby node number, the identifier of the storage unit may be a storage unit number (such as a page number), and the address of the standby node may be an IP/MAC address of the standby node. It can be understood that the primary node may determine a storage unit in any standby node in the database system by querying the mapping table.

Figure 6:
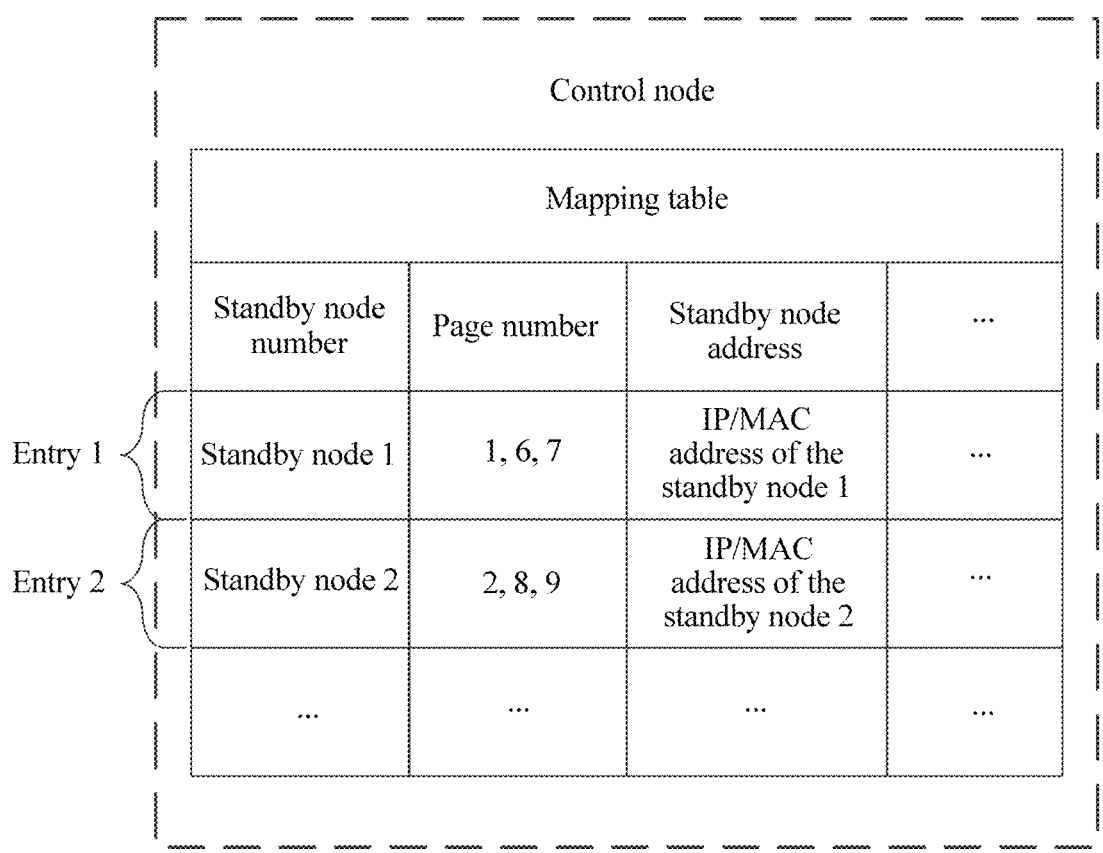
FIG. 6 is a schematic diagram of a mapping table according to an embodiment of the present disclosure.

For example, referring to FIG. 6, FIG. 6 is a simple schematic diagram of a mapping table according to an embodiment of the present disclosure. The mapping table includes an entry 1, an entry 2, and the like. The entry 1 includes a standby node number <standby node 1>, page numbers <1, 6, and 7>, an IP address/MAC address of the standby node 1, and the like. The entry 2 includes a standby node number <standby node 2>, page numbers <2, 8, and 9>, an IP address/MAC address of the standby node 2, and the like. By querying the mapping table, the primary node may determine that the standby node 1, the standby node 2, and the like exist in the database system, and may further determine that pages in a local cache of the standby node 1 are three pages whose page numbers are respectively 1, 6, and 7, that is, a corresponding storage unit set is {page 1, page 6, page 7}, and determine that pages in a local cache of the standby node 2 are three pages whose page numbers are respectively 2, 8, and 9, that is, a corresponding storage unit set is {page 2, page 8, page 9}. Entries in the mapping table may include related mapping information of all standby nodes in the database system. Therefore, the primary node may determine a standby node in the database system and a page in each standby node by querying the mapping table.

It should be noted that there is no absolute sequence between step S504 and step S505, that is, in a specific embodiment, step S504 may be performed before step S505, or after step S505, or step S504 and step S505 may be simultaneously performed. Description of the foregoing embodiment shall not be construed as a limitation on the present disclosure.

Step S506: The control node generates a storage unit intersection set according to a storage unit that exists in both the first storage unit set and the second storage unit set.

Further, the control node determines a modified page in the primary node using step S504, and determines a page in each standby node using step S505. Therefore, the control node may determine a page that needs to be updated in the standby node. For example, in a specific implementation, the operation log includes multiple operation records, each operation record is a redo log, and each redo log includes an identifier of a modified page in the primary node (for example, a redo log 1 includes an identifier of the page 1, and a redo log 2 includes an identifier of the page 2). Therefore, after receiving the operation log, the control node finds that the operation log includes the redo log 1, the redo log 2, and a redo log 3, that is, a set of storage units modified in the primary node that is determined by the control node is {page 1, page 2, page 3}. The control node determines, according to the mapping table, that the standby node 1 and the standby node 2 exist in the database system. The control node determines that a storage unit set in the standby node 1 is {page 1, page 6, page 7}, and determines that a storage unit set in the standby node 2 is {page 2, page 8, page 9}. In this case, for the standby node 1, the page 1 exists in both the foregoing two storage unit sets, and the storage unit intersection set is {page 1}. For the standby node 2, the page 2 exists in both the foregoing two storage unit sets, and the storage unit intersection set is {page 2}.

Step S507: The control node obtains an operation record associated with the storage unit intersection set from the operation log.

It can be understood that after determining the storage unit intersection set, the control node may obtain, based on the storage unit intersection set, the operation record corresponding to the storage unit intersection set from the operation log. For example, in a specific implementation, each operation record is a redo log. The operation log includes a redo log 1, a redo log 2, and a redo log 3. The storage unit intersection set corresponding to the standby node 1 is {page 1}, and the storage unit intersection set corresponding to the standby node 2 is {page 2}. In this case, for the standby node 1, an operation record obtained by the control node from the operation log is {redo log 1}, and for the standby node 2, an operation record obtained by the control node from the operation log is {redo log 2}.

Step S508: The control node sends the corresponding operation record to the standby node.

After obtaining the operation record corresponding to the storage unit intersection set, the control node sends the corresponding operation record to the standby node. When there are multiple standby nodes, in a specific implementation, the control node may successively send, to the standby nodes, operation records that are required by the standby nodes. For example, the control node successively queries entries in the mapping table, determines, based on the operation log, whether a standby node in the entry includes a storage unit intersection set, and if the standby node in the entry includes the storage unit intersection set, sends an operation record corresponding to the storage unit intersection set to the standby node. In another specific implementation, the control node obtains operation records that are required by different standby nodes, and distributes the required operation records to the different standby nodes respectively.

Step S509: The standby node performs a corresponding operation on a storage unit, in a local cache, that is indicated by the associated operation record.

After receiving the operation record, the standby node first determines whether the storage unit corresponding to the operation record exists in the local cache of the standby node. If the storage unit corresponding to the operation record exists in the local cache of the standby node, the operation record is applied to the corresponding storage unit, or if the storage unit corresponding to the operation record does not exist in the local cache of the standby node, the operation record is discarded. In the solution of this embodiment of the present disclosure, an operation record discard case can be avoided because all operation records received by the standby node are operation records required by the standby node.

For example, an operation record 1 records a set of instructions in which the primary node performs data modification on a table in the page 1 of the local cache. In this case, after receiving the operation record 1, the standby node 1 performs a corresponding operation on the page 1 in the local cache of the standby node 1 based on the instruction set such that the page 1 in the standby node is updated to a state that is the same as that of the page 1 in the primary node in order to implement synchronization between same pages in the primary node and the standby node.

Figure 7:
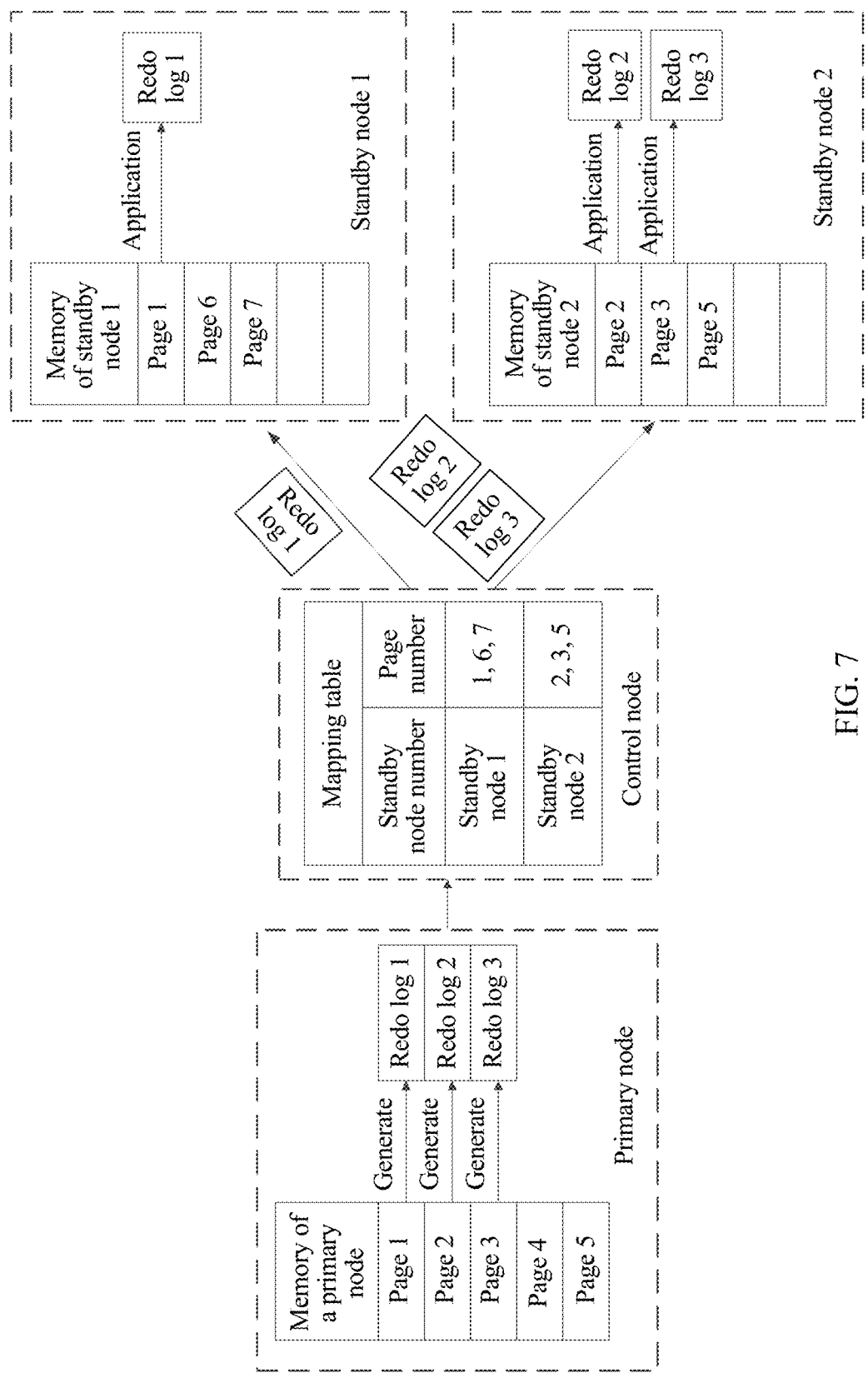
FIG. 7 is a schematic diagram of a redo log processing procedure in a database system according to an embodiment of the present disclosure.

To better understand the foregoing steps in this embodiment of the present disclosure, the following uses a specific embodiment scenario as an example. As shown in FIG. 7, a database system used in this embodiment of the present disclosure includes a primary node, a control node, a standby node 1, a standby node 2, and a storage device (not shown in the figure). A memory of the primary node includes a page 1, a page 2, a page 3, a page 4, and a page 5, a memory of the standby node 1 includes the page 1, a page 6, and a page 7, and a memory of the standby node 2 includes the page 2, the page 3, and the page 5. When performing a read/write transaction, the primary node modifies the page 1, the page 2, and the page 3, correspondingly generates an operation log (including a redo log 1, a redo log 2, and a redo log 3), and sends the operation log to the control node. The control node determines, based on page identifiers in the operation log, that the page 1, the page 2, and the page 3 in the primary node are modified, searches a mapping table, determines that the memory of the standby node 1 includes the page 1, the page 6, and the page 7 such that the primary node obtains, from the operation log, the redo log 1 required by the standby node 1, and sends the redo log 1 to the standby node 1, and determines that the memory of the standby node 2 includes the page 2, the page 3, and the page 5 such that the primary node obtains, from the operation log, the redo log 2 and the redo log 3 that are required by the standby node 2, and sends the redo log 2 and the redo log 3 to the standby node 2. After the standby node 1 receives the redo log 1, the redo log 1 is applied to the page 1 in the memory of the standby node 1 to update the page 1. After the standby node 2 receives the redo log 2 and the redo log 3, the redo log 2 is applied to the page 2 in the memory of the standby node 2 to update the page 2, and the redo log 3 is applied to the page 3 in the memory of the standby node 2 to update the page 3.

It can be learned that to implement the solution in this embodiment of the present disclosure, when performing the read/write transaction, the primary node modifies a local cache of the primary node or a page in the storage device, and after generating the corresponding operation log (all redo logs), sends the operation log to the control node. The control node may obtain, by querying the mapping table, an operation record (a required redo log) required by each standby node in the database system, and sends the operation record to a corresponding standby node such that the standby node updates a storage unit in the local cache. That is, according to this embodiment of the present disclosure, the control node may pertinently send a required redo log to the standby node. This avoids transmission of an unrelated redo log in a communications network, effectively reduces redo logs in the communications network, and saves network resources. The primary node needs only to send all the redo logs to the control node. After the control node manages all the redo logs, all redo logs received by the standby node are required by the standby node. Therefore, a discard operation performed for the unrelated redo log is omitted. In this embodiment of the present disclosure, CPU consumption of the primary node/standby node can be effectively reduced.

Figure 8:
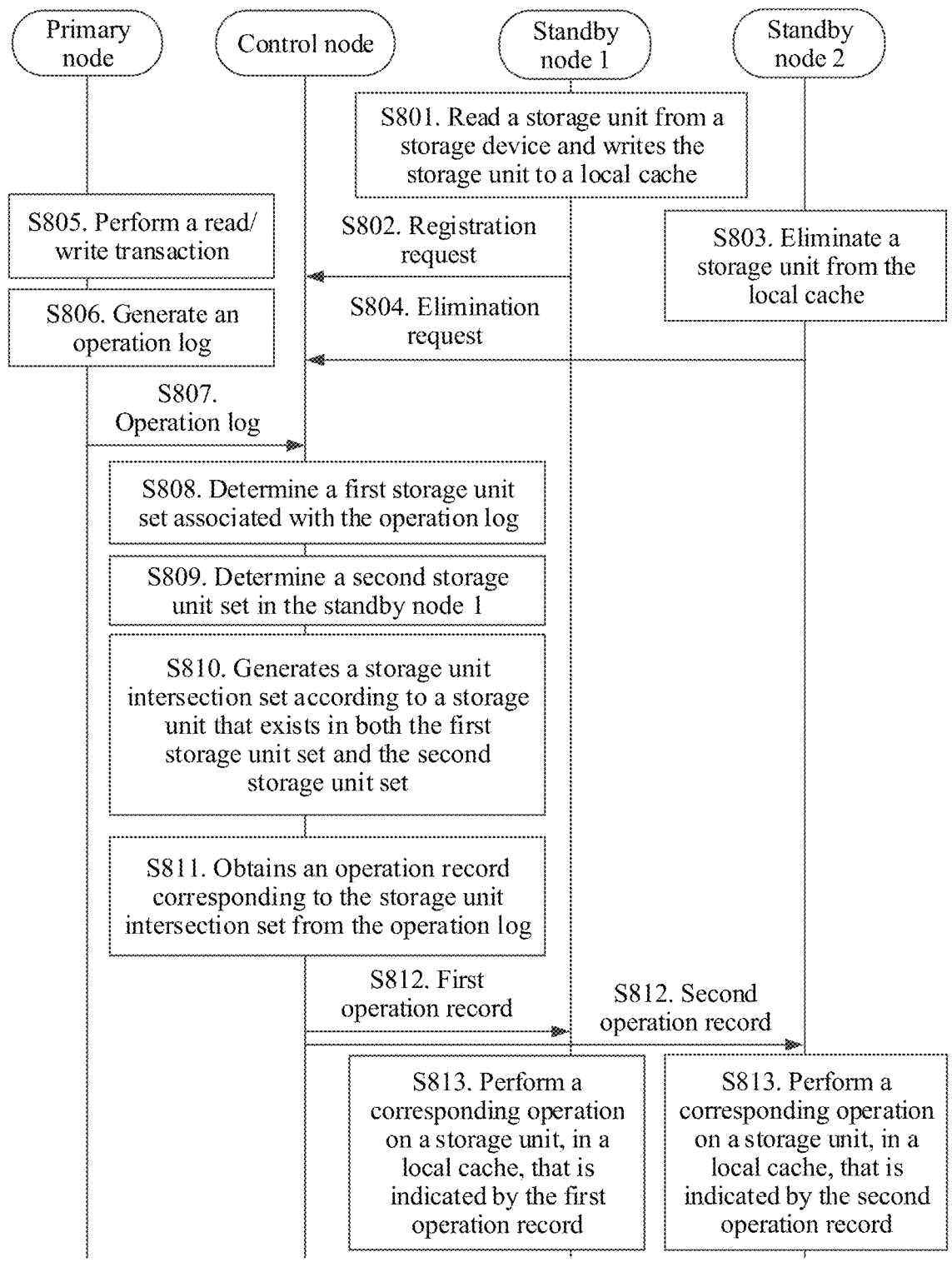
FIG. 8 is a schematic flowchart of still another primary node-standby node data transmission method according to an embodiment of the present disclosure.

Referring to FIG. 8, FIG. 8 is a schematic flowchart of another primary node-standby node data transmission method according to an embodiment of the present disclosure. In this embodiment of the present disclosure, a database system includes one primary node, at least one standby node (a standby node 1 and a standby node 2 in the figure), a storage device (not shown in the figure), and a control node. The primary node is separately connected to the control node and the storage device, and the standby node is separately connected to the control node and the storage device. Referring to FIG. 8, the method includes the following steps.

Step S801: The standby node 1 reads a storage unit from the storage device and writes the storage unit to a local cache.

Figure 9:
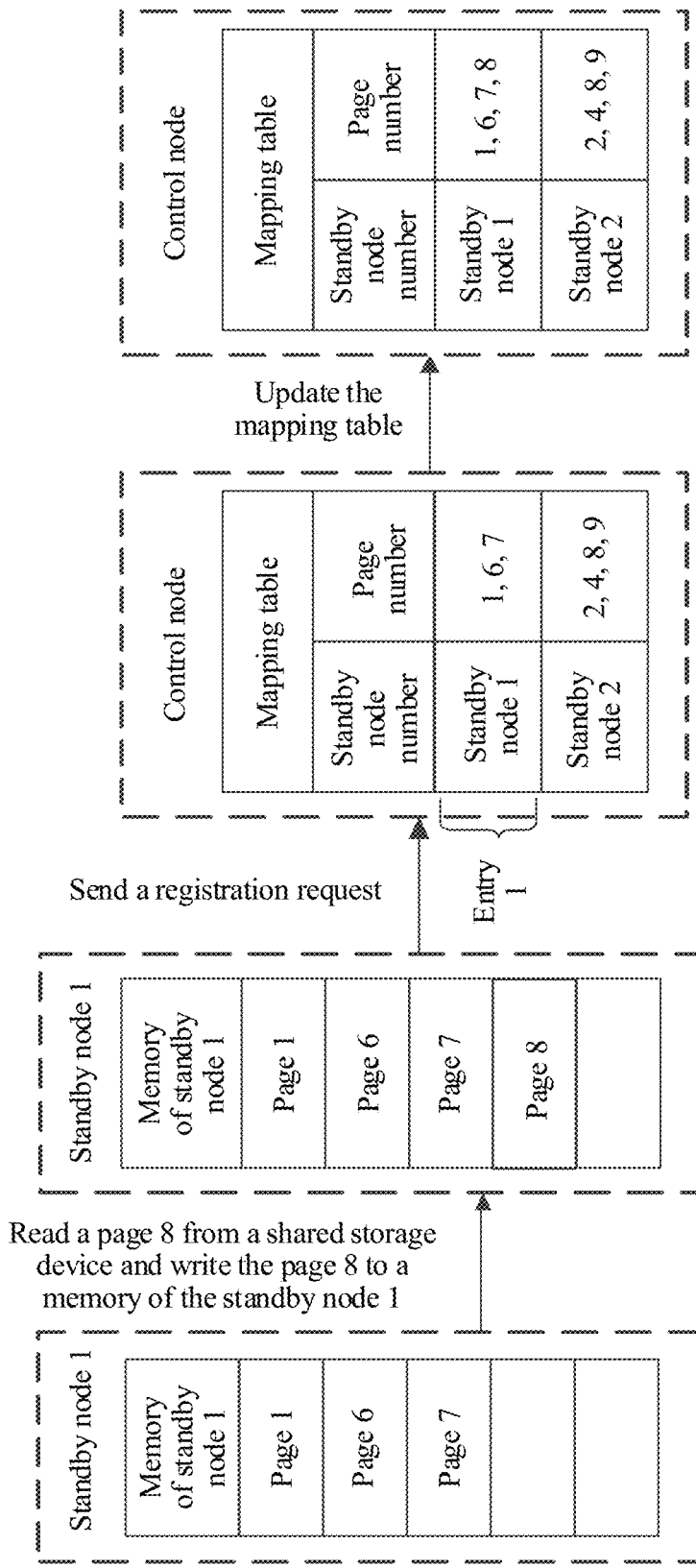
FIG. 9 is a schematic flowchart in which a standby node sends a registration request to a primary node according to an embodiment of the present disclosure.

In this embodiment of the present disclosure, because the standby node shares a storage medium with the primary node, a user (or user equipment) may send an instruction to the standby node when the user needs to view database data. After receiving the instruction, the standby node first determines whether the local cache includes a storage unit corresponding to the instruction, and if the local cache does not include the storage unit corresponding to the instruction, reads the corresponding storage unit from the storage device and writes the corresponding storage unit to the local cache. The storage unit stores the database data required by the user, that is, the standby node reads and writes a copy of the database data stored in the storage device. In a specific embodiment, as shown in FIG. 9, a user (or user equipment) sends an instruction to a standby node 1 in order to view data in a page 8. The standby node 1 searches a memory of the standby node 1 based on the instruction, and finds that the memory includes only a page 1, a page 6, and a page 7, and does not include the page 8. Therefore, the standby node 1 accesses the storage device, and reads the page 8 from the storage device and writes the page 8 to the memory of the standby node 1. In this way, the user (or the user equipment) can normally view the data in the page 8.

It can be understood that when the database system includes multiple standby nodes, for example, includes the standby node 1 and the standby node 2, both the standby node 1 and the standby node 2 can determine, according to the instruction of the user (or the user equipment), whether a page required by the user (or the user equipment) exists in the local cache, and if the page required by the user (or the user equipment) does not exist in the local cache, read the page from the storage device and write the page to the local cache. It should be noted that different standby nodes independently complete the foregoing process, and a sequence is not limited.

Step S802: The standby node 1 sends a registration request to the control node, and the control node correspondingly receives the registration request, and updates a mapping table based on the registration request.

In this embodiment of the present disclosure, the control node is an independent device, for example, an independent physical server.

After the standby node reads the corresponding storage unit from the storage device and writes the corresponding storage unit to the local cache, a quantity of storage units in the local cache changes. In this case, to notify the control node of a changing status of the quantity of storage units in the local cache of the standby node, the standby node correspondingly generates a registration request, and sends the registration request to the control node. The registration request includes an identifier of the standby node and an identifier of a to-be-registered storage unit (that is, an identifier of the storage unit that is read and written). After receiving the registration request, the control node determines, according to the identifier of the standby node, a mapping table entry corresponding to the identifier of the standby node, and adds the identifier of the to-be-registered storage unit to the entry corresponding to the identifier of the standby node, to update the mapping table.

In a specific embodiment, as shown in FIG. 9, the standby node 1 correspondingly generates the registration request after reading the page 8 from the storage device and writing the page 8 to the memory of the standby node 1. The registration request includes an identifier of the standby node 1 and an identifier (a page number) of the page 8. After receiving the registration request, the control node determines, according to the identifier of the standby node 1, that an entry corresponding to an identifier of the standby node 1 is an entry 1. Then, the control node adds the identifier of the page 8 to the entry 1, that is, page numbers <1, 6, and 7> in the entry 1 in the mapping table are updated to page numbers <1, 6, 7, and 8>. The control node updates the mapping table.

When the database system includes multiple standby nodes, for example, includes the standby node 1 and the standby node 2, each of the standby node 1 and the standby node 2 may generate a registration request and then send the registration request to the control node. Correspondingly, the control node responds to the registration request, and completes mapping table updating.

In a specific implementation of the present disclosure, information about the control node may be pre-configured in the standby node. Further, a member list is configured in the standby node, and the member list records an identifier of the control node. After the standby node generates the registration request, the standby node sends the registration request to the control node based on the identifier of the control node. It can be understood that when the control node includes multiple physical servers, different physical servers manage different standby node groups. In this case, the member list in the standby node records an identifier of a physical server corresponding to a standby node group in which the standby node exists. After the standby node generates the registration request, the standby node sends the registration request to the physical server according to the identifier of the physical server.

It should be noted that in still another specific implementation of the present disclosure, when starting to perform a read operation, if a page corresponding to the read operation does not exist in a memory, the standby node first generates a registration request, and sends the registration request to the control node such that the control node updates the mapping table, and then reads the page from the storage device and writes the page to the local cache. That is, there is no necessary sequence between step S801 and step S802.

Step S803: The standby node 2 eliminates a storage unit from the local cache.

In this embodiment of the present disclosure, when storage space of the local cache of the standby node is insufficient, the standby node deletes some storage units from the local cache based on a pre-configured elimination policy, and the elimination indicates that data in the storage unit is deleted to obtain storage space. The pre-configured elimination policy may be a storage-time-based policy. In a specific implementation, when the standby node detects that the storage space of the local cache is insufficient (for example, detects that a storage volume is greater than a preset threshold), the standby node detects a storage time of each storage unit in the local cache, and eliminates a storage unit whose storage time is greater than a preset duration. The pre-configured elimination policy may be a priority-based policy. In another specific implementation, when the standby node detects that the storage space of the local cache is insufficient, the standby node detects a priority of each storage unit in the local cache, and eliminates a storage unit whose priority is less than a preset level.

Figure 10:
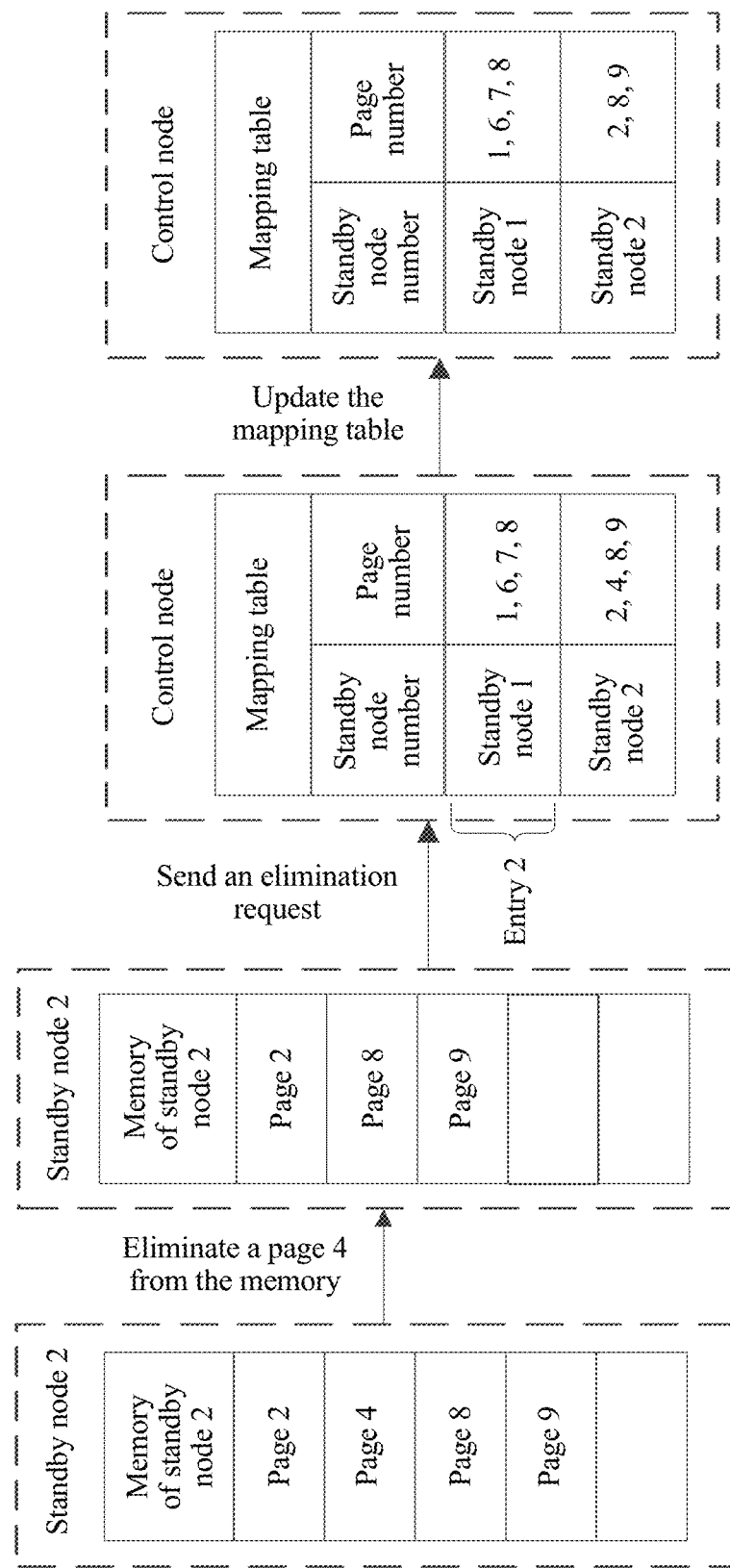
FIG. 10 is a schematic flowchart in which a standby node sends a deletion request to a primary node according to an embodiment of the present disclosure.

For example, referring to FIG. 10, a memory of the standby node 2 includes a page 2, a page 4, a page 8, and a page 9. When the memory of the standby node 2 is insufficient, the standby node 2 determines, based on the pre-configured elimination policy, that a page that needs to be deleted is the page 4. Therefore, the standby node 2 eliminates the page 4 from the memory, and the other pages remain unchanged.

It can be understood that when the database system includes multiple standby nodes, for example, includes the standby node 1 and the standby node 2, both the standby node 1 and the standby node 2 can perform page elimination based on the pre-configured elimination policy in an insufficient memory case. It should be noted that different standby nodes independently complete the foregoing process, and a sequence is not limited.

Step S804: The standby node 2 sends an elimination request to the control node, and the control node correspondingly receives the elimination request, and updates the mapping table based on the elimination request.

After the standby node eliminates the storage unit from the local cache, a quantity of storage units in the local cache changes. In this case, to notify the control node of a changing status of the quantity of storage units in the local cache of the standby node, the standby node correspondingly generates the elimination request, and sends the elimination request to the control node. The elimination request includes an identifier of the standby node and an identifier of a to-be-deleted storage unit (that is, an identifier of the eliminated storage unit). After receiving the elimination request, the control node determines, according to the identifier of the standby node, a mapping table entry corresponding to the identifier of the standby node, and deletes the identifier of the to-be-deleted storage unit from the entry corresponding to the identifier of the standby node, to implement mapping table updating.

In a specific embodiment, as shown in FIG. 10, the standby node 2 correspondingly generates the elimination request after eliminating the page 4 from the memory, and the elimination request includes an identifier of the standby node 2 and an identifier (a page number) of the page 4. After receiving the elimination request, the control node determines, according to the identifier of the standby node 2, that an entry corresponding to the identifier of the standby node 2 is an entry 2. Then, the control node eliminates the identifier of the page 4 from the entry 2, that is, page numbers <2, 4, 8, and 9> in the entry 2 in the mapping table are updated to page numbers <2, 8, and 9>. The control node updates the mapping table.

It can be understood that when the database system includes multiple standby nodes, for example, includes the standby node 1 and the standby node 2, each of the standby node 1 and the standby node 2 may generate a deletion request and then send the deletion request to the control node. Correspondingly, the control node responds to the deletion request, and completes mapping table updating.

In a specific implementation of the present disclosure, information about the control node may be pre-configured in the standby node. Further, a member list is configured in the standby node, and the member list records an identifier of the control node. After the standby node generates the deletion request, the standby node sends the deletion request to the control node based on the identifier of the control node. It can be understood that when the control node includes multiple physical servers, different physical servers manage different standby node groups. In this case, the member list in the standby node records an identifier of a physical server corresponding to a standby node group in which the standby node exists. After the standby node generates the deletion request, the standby node sends the deletion request to the physical server according to the identifier of the physical server.

It should be noted that in still another specific implementation of the present disclosure, when the standby node detects that the memory is insufficient, the standby node determines, based on the pre-configured elimination policy, a page that needs to be deleted. In this case, the standby node first generates the deletion request, sends the deletion request to the control node such that the control node updates the mapping table, and then eliminates the page from the memory. That is, there is no necessary sequence between step S803 and step S804.

It can be further understood that there is no absolute sequence between step S801 and step S802 or between step S803 and step S804.

Step S805: The primary node performs a read/write transaction.

The primary node processes a transaction according to an operation instruction of a user (or user equipment), and the transaction may be a database transaction. For example, the database transaction is reading, editing, inserting, or updating a table in a database. After the primary node receives the operation instruction of the user (or the user equipment), the primary node first queries the local cache (such as a memory of the primary node), and determines whether the local cache includes database data indicated by the operation instruction. If the local cache includes the database data indicated by the operation instruction, the primary node directly processes the database data, or if the local cache does not include the database data indicated by the operation instruction, the primary node reads the database data from the storage device and writes the database data to the local cache, and then processes the database data.

Step S806: The primary node generates an operation log.

In a page modification case, the primary node generates an operation record for each page. Each operation record corresponds to a page, and each operation record indicates a record of performing a write operation on a page. In a specific implementation, each operation record is a redo log for a modified page. When the primary node completes page modification and commits the transaction, the primary node summarizes all operation records to generate the operation log, that is, the operation log is a set of redo logs for all modified pages.

Step S807: The primary node sends the operation log to the control node.

The primary node may be communicatively connected to the control node in a wired or wireless manner. In a specific implementation, the member list may be pre-configured in the primary node. The member list records an identifier of the control node. After generating the operation log, the primary node sends the operation log to the control node based on the identifier of the control node. When the control node includes multiple physical servers, different physical servers manage different standby node groups. In this case, the member list in the standby node records identifiers of all physical servers. After the primary node generates the operation log, the primary node sends the operation log to each physical server based on the member list.

Step S808: The control node determines a first storage unit set associated with the operation log.

In a specific implementation, the operation log includes all operation records, and each operation record includes a corresponding page identifier. Therefore, the control node may determine, using the page identifier, a page corresponding to the operation log.

Step S809: The control node determines a second storage unit set in the standby node 1.

In a specific implementation, by querying the mapping table, the primary node determines that the standby node 1 and the standby node 2 exist in the database system, and may determine a page in the standby node 1 and a page in the standby node 2.

It can be understood that there is no necessary sequence between step S808 and step S809.

Step S810: The control node generates a storage unit intersection set according to a storage unit that exists in both the first storage unit set and the second storage unit set.

Further, the control node determines a modified page in the primary node using step S808, and separately determines a page in the standby node 1 and a page in the standby node 2 using step S809. Therefore, the control node may determine a storage unit intersection set corresponding to each of the standby node 1 and the standby node 2.

Step S811: The control node obtains an operation record corresponding to the storage unit intersection set from the operation log.

It can be understood that after determining the storage unit intersection set corresponding to each of the standby node 1 and the standby node 2, the control node may obtain the operation record corresponding to the storage unit intersection set from the operation log based on the storage unit intersection set.

Step S812: The control node sends the corresponding operation record to the standby node.

In a specific implementation, the control node may successively send corresponding operation records to the standby nodes. For example, the control node queries an entry 1 in the mapping table 1, first determines, based on the operation log, that the standby node 1 has the storage unit intersection set, and sends an operation record corresponding to the storage unit intersection set to the standby node 1, and then continues to query an entry 2 in the mapping table, determines that the standby node 2 has the storage unit intersection set, and then sends an operation record corresponding to the storage unit intersection set to the standby node 1.

In another specific implementation, the control node queries the mapping table, and finds that both the standby node 1 and the standby node 2 has storage unit intersection sets. After obtaining operation records corresponding to the storage unit intersection sets of the standby node 1 and the standby node 2, the control node sends the corresponding operation records to the standby node 1 and the standby node 2 from different ports respectively.

Step S813: The standby node performs a corresponding operation on a storage unit, in a local cache, that is indicated by the corresponding operation record.

It can be understood that after receiving the operation record sent by the control node, the standby node 1 performs a corresponding operation on the storage unit, in the local cache, that is indicated by the operation record. Similarly, after receiving the operation record sent by the control node, the standby node 2 performs a corresponding operation on the storage unit, in the local cache, that is indicated by the operation record.

It should be noted that for specific implementations of step S805 to step S813, refer to related descriptions in the embodiments in FIG. 5 to FIG. 7.

It should be further noted that in a specific application scenario, step S801 and step S802 may be performed before, between, or after step S805 to step S812, and step S803 and step S804 may be performed before, between, or after step S805 to step S812. The description of the foregoing embodiment is merely to illustrate an application scene in this embodiment of the present disclosure, and shall not be construed as a limitation on the present disclosure.

It can be learned that to implement the solution in this embodiment of the present disclosure, in the database system, when performing the read/write transaction, the primary node modifies a local cache of the primary node or a page in the storage device, and after generating the corresponding operation log (all redo logs), sends the operation log to the control node. The control node may obtain, by querying the mapping table, an operation record (a required redo log) required by each standby node in the database system, and sends the operation record to a corresponding standby node such that the standby node updates a storage unit in the local cache. In this process, the standby node may send the registration request or the deletion request to the control node according to a page change in the memory of the standby node such that the control node updates the mapping table. A mapping table update mechanism is introduced such that the database system can be more practicable and reliable. According to this embodiment of the present disclosure, the control node may pertinently send a required redo log to the standby node. This avoids transmission of an unrelated redo log in a communications network, effectively reduces redo logs in the communications network, and saves network resources. The primary node needs only to send all the redo logs to the control node. After the control node manages all the redo logs, all redo logs received by the standby node are required by the standby node. Therefore, a discard operation performed for the unrelated redo log is omitted. In this embodiment of the present disclosure, CPU consumption of the primary node/standby node can be effectively reduced.

Figure 11:
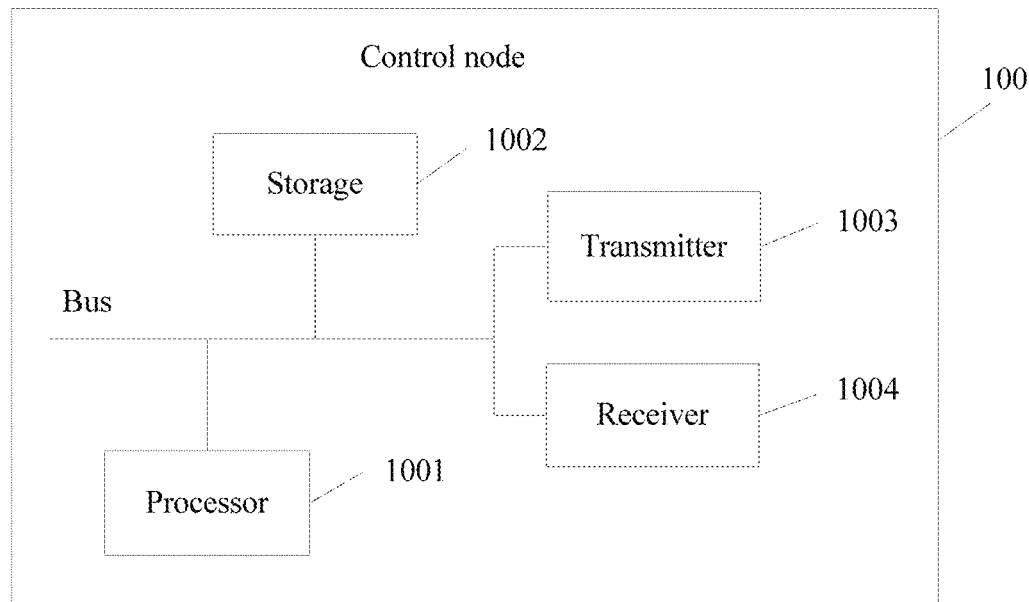
FIG. 11 is a schematic structural diagram of a control node according to an embodiment of the present disclosure.

Based on a same disclosure concept, an embodiment of the present disclosure provides a control node 100. Referring to FIG. 11, the control node 100 includes a transmitter 1003, a receiver 1004, a storage 1002, and a processor 1001 coupled to the storage 1002. The transmitter 1003, the receiver 1004, the storage 1002, and the processor 1001 may be connected to each other using a bus or in another manner (in an example in FIG. 11, the bus is used for connection).

The processor 1001 may be one or more CPUs. A processor is used as an example in FIG. 11. When the processor 1001 is one CPU, the CPU may be a single-core CPU, or may be a multi-core CPU.

The storage 1002 includes but is not limited to a random access memory (RAM), a read-only memory (ROM), an erasable programmable ROM (EPROM), or a compact disc ROM (CD-ROM). The storage 1002 is configured to store a related instruction and related data, and is further configured to store program code. The program code is used to implement a function of the control node in the embodiment in FIG. 5 or FIG. 8.

The transmitter 1003 is configured to send data to the outside.

The receiver 1004 is configured to receive data from the outside.

Further, the processor 1001 is configured to invoke the program code stored in the storage 1002, and implement the following steps of obtaining, using the receiver 1004, an operation log generated by the primary node, and storing the operation log in the storage, where the operation log includes at least one operation record, and each operation record indicates a record of performing, by the primary node, a write operation on a local cache of the primary node or a storage unit in the storage device, determining a first storage unit set corresponding to a first standby node, and determining a second storage unit set corresponding to the at least one operation record, where the first standby node is one of the at least one standby node, and the first standby node stores a storage unit corresponding to the first storage unit set, obtaining an operation record from the operation log, wherein the operation record is corresponding to a storage unit intersection set, where the storage unit intersection set is an intersection set of storage units in the first storage unit set and the second storage unit set, and sending the corresponding operation record to the first standby node using the transmitter 1003.

Further, determining, by the processor 1001, a first storage unit set in the first standby node includes determining, by the processor 1001, the first storage unit set in the first standby node according to a mapping table, where the mapping table includes at least one entry, each entry includes an identifier of a standby node and identifiers of storage units corresponding to a local cache of the standby node, and one of the entries includes an identifier of the first standby node and identifiers of storage units corresponding to a local cache of the first standby node.

Optionally, that the mapping table includes at least one entry is as follows.

When there are at least two standby nodes and storage units corresponding to local caches of different standby nodes are inconsistent, the mapping table includes at least two entries, and identifiers of storage units corresponding to different entries are inconsistent.

Optionally, the processor 1001 is further configured to obtain, using the receiver 1004, a mapping table update request sent by a second standby node, where the mapping table update request includes an identifier of the second standby node and an identifier of a storage unit, and the second standby node is any one of the at least one standby node, and query, in the mapping table, an entry corresponding to the identifier of the second standby node, and update, based on the identifier of the storage unit, the entry corresponding to the identifier of the second standby node.

In a specific embodiment, the processor 1001 is further configured to receive, using the receiver 1004, a registration request sent by the second standby node, where the registration request includes the identifier of the second standby node and an identifier of a to-be-registered storage unit, and the second standby node is any one of the at least one standby node, and query, in the mapping table, the entry corresponding to the identifier of the second standby node, and add the identifier of the to-be-registered storage unit to the entry corresponding to the identifier of the second standby node.

In a specific embodiment, the processor 1001 is further configured to receive, using the receiver 1004, a deletion request sent by a third standby node, where the deletion request includes an identifier of the third standby node and an identifier of a to-be-deleted storage unit, and the third standby node is any one of the at least one standby node, and query an entry corresponding to the identifier of the third standby node in the mapping table, and delete the identifier of the to-be-deleted storage unit from the entry corresponding to the identifier of the third standby node.

Further, the storage unit is a page.

It should be noted that in this embodiment of the present disclosure, the control node may be an independent device in a database system. For example, the control node is an independent physical server. The control node may also be a dependent device. In this case, in an application scenario, the control node may be built in the primary node, or may exist as a function module of the primary node (for example, as different virtual machines, the primary node and the control node coexist in a same physical server by means of input/output (I/O) interface connection). In another application scenario, the control node may be built in a standby node, or may exist as a function module of a standby node (for example, as different virtual machines, a standby node and the control node coexist in a same physical server by means of I/O interface connection).

It should be further noted that for execution steps of the processor 1001 and other technical features related to the processor 1001, refer to related content of the control node in the method embodiment in FIG. 5 or FIG. 8, and details are not repeatedly described herein.

Figure 12:
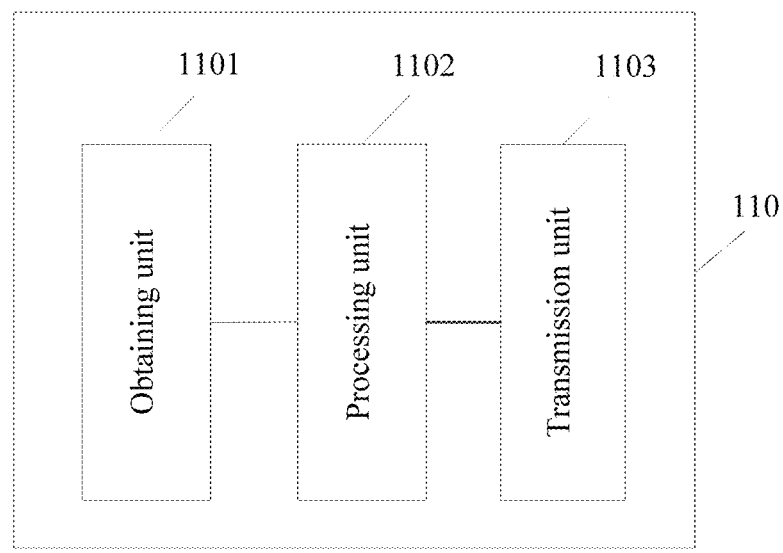
FIG. 12 is a schematic structural diagram of another control node according to an embodiment of the present disclosure.

Based on a same disclosure concept, an embodiment of the present disclosure provides a control node 110. Referring to FIG. 12, FIG. 12 is a schematic structural diagram of still another control node according to an embodiment of the present disclosure. The control node 110 may include an obtaining unit 1101, a processing unit 1102, and a transmission unit 1103. Each function unit is described as follows.

The obtaining unit 1101 is configured to obtain an operation log generated by the primary node, where the operation log includes at least one operation record, each operation record corresponds to one storage unit, and each operation record indicates a record of performing, by the primary node, a write operation on a local cache of the primary node or a storage unit in the storage device.

The processing unit 1102 is configured to determine a first storage unit set corresponding to a first standby node, and determine a second storage unit set corresponding to the at least one operation record, where the first standby node is one of the at least one standby node, and the first standby node stores a storage unit corresponding to the first storage unit set, and further configured to obtain an operation record corresponding to a storage unit intersection set from the operation log, where the storage unit intersection set is an intersection set of storage units in the first storage unit set and the second storage unit set.

The transmission unit 1103 is configured to send the corresponding operation record to the first standby node.

That the processing unit 1102 is configured to determine a first storage unit set corresponding to first standby node is as follows.

The processing unit 1102 is configured to determine the first storage unit set in the first standby node according to a mapping table, where the mapping table includes at least one entry, each entry includes an identifier of a standby node and identifiers of storage units corresponding to a local cache of the standby node, and one of the entries includes an identifier of the first standby node and identifiers of storage units corresponding to a local cache of the first standby node.

When there are at least two standby nodes and storage units corresponding to local caches of different standby nodes are inconsistent, the mapping table includes at least two entries, and identifiers of storage units corresponding to different entries are inconsistent.

The obtaining unit 1101 is further configured to receive a mapping table update request sent by a second standby node, where the mapping table update request includes an identifier of the second standby node and an identifier of a storage unit, and the second standby node is one of the at least one standby node.

The processing unit 1102 is further configured to query, in the mapping table, an entry corresponding to the identifier of the second standby node, and update, based on the identifier of the storage unit, the entry corresponding to the identifier of the second standby node.

Further, the obtaining unit 1101 is further configured to receive a registration request sent by the second standby node, where the registration request includes the identifier of the second standby node and an identifier of a to-be-registered storage unit, and the second standby node is any one of the at least one standby node. The processing unit 1102 is further configured to query, in the mapping table, the entry corresponding to the identifier of the second standby node, and add the identifier of the to-be-registered storage unit to the entry corresponding to the identifier of the second standby node.

Further, the obtaining unit 1101 is further configured to receive a deletion request sent by a third standby node, where the deletion request includes an identifier of the third standby node and an identifier of a to-be-deleted storage unit, and the third standby node is any one of the at least one standby node. The processing unit 1102 is further configured to query an entry corresponding to the identifier of the third standby node in the mapping table, and delete the identifier of the to-be-deleted storage unit from the entry corresponding to the identifier of the third standby node.

Further, the storage unit is a page.

It should be noted that in this embodiment of the present disclosure, the control node may be an independent device in a database system. For example, the control node is an independent physical server. The control node may also be a dependent device. In this case, in an application scenario, the control node may be built in the primary node, or may exist as a function module of the primary node (for example, as different virtual machines, the primary node and the control node coexist in a same physical server by means of I/O interface connection). In another application scenario, the control node may be built in a standby node, or may exist as a function module of a standby node (for example, as different virtual machines, a standby node and the control node coexist in a same physical server by means of I/O interface connection). In still another application scenario, the control node is the primary node, that is, in addition to a function of the primary node in the foregoing embodiment, the primary node further has a function of the control node in the foregoing embodiment.

It should be noted that with detailed description of the embodiment in FIG. 5 or FIG. 8, a person skilled in the art may clearly understand an implementation method of each function unit in the control node 110. Therefore, for conciseness of the specification, details are not repeatedly described herein.

All or some of the foregoing embodiments may be implemented by means of software, hardware, firmware, or any combination thereof. When software is used to implement the embodiments, the embodiments may be implemented in a form of a computer program product. The computer program product includes one or more computer instructions. When the computer program instruction is loaded and executed on a computer, all or a part of the procedures or functions are generated according to the embodiments of the present disclosure. The computer may be a general-purpose computer, a dedicated computer, a computer network, or other programmable apparatuses. The computer instruction may be stored in a computer readable storage medium, or may be transmitted from a computer readable storage medium to another computer readable storage medium. For example, the computer instruction may be transmitted from a web site, computer, server, or data center to another web site, computer, server, or data center in a wired (for example, a coaxial cable, an optical fiber, or a digital subscriber line) or wireless (for example, infrared or microwave) manner. The computer readable storage medium may be any usable medium accessible by a computer, or a data storage device integrating one or more usable media, such as a server or a data center. The usable medium may be a magnetic medium (for example, a soft disk, a hard disk, or a magnetic tape), an optical medium (for example, a digital versatile disc (DVD)), a semiconductor medium (for example, a solid state disk), or the like.

In the foregoing embodiments, the description of each embodiment has respective focuses. For a part that is not described in detail in an embodiment, refer to related descriptions in other embodiments.

The invention claimed is:

1. A primary node-standby node data transmission method implemented by a control node in a database system comprising a primary node, the control node, at least one standby node, and a storage device, comprising:

obtaining an operation log from a primary node, wherein the primary node and the at least one standby node share data in the storage device, wherein the operation log comprises at least one operation record that indicates a record of a write operation by the primary node on either a local cache of the primary node or a storage unit in the storage device;

obtaining an operation record from the operation log, wherein the operation record corresponds to a storage unit intersection set, wherein the storage unit intersection set is an intersection set between a first storage unit set and a second storage unit set, wherein the first storage unit set corresponds to a first standby node of the at least one standby node, wherein the first standby node comprises a first storage unit that corresponds to the first storage unit set, wherein the first storage unit is obtained from the storage device, and wherein the second storage unit set comprises a second storage unit that corresponds to the at least one operation record; and sending the operation record to the first standby node.

2. The primary node-standby node data transmission method of claim 1, wherein determining the first storage unit set comprises determining the first storage unit set in the first standby node according to a mapping table, wherein the mapping table comprises at least one entry, wherein each entry comprises an identifier of a standby node and identifiers of storage units that correspond to a local cache of the standby node, and wherein a first entry of the at least one entry comprises an identifier of the first standby node and identifiers of storage units that correspond to a local cache of the first standby node.

3. The primary node-standby node data transmission method of claim 2, further comprising:

receiving a mapping table update request from a second standby node of the at least one standby node, wherein the mapping table update request comprises an identifier of the second standby node and an identifier of a storage unit;

querying, in the mapping table, a second entry that corresponds to the identifier of the second standby node; and updating, based on the identifier of the storage unit, the second entry that corresponds to the identifier of the second standby node.

4. The primary node-standby node data transmission method of claim 2, further comprising determining a third storage unit set in a third standby node according to the mapping table, wherein the third standby node is in the at least one standby node and is other than the first standby node, and wherein the third storage unit set is not the same as the first storage unit set.

5. The primary node-standby node data transmission method of claim 1, wherein the storage unit is a page.

6. A control node, comprising:

a storage comprising data and instructions;

a transmitter coupled to the storage;

a receiver coupled to the transmitter and the storage and configured to receive an operation log from a primary node; and a processor coupled to the storage, the transmitter, and the receiver and configured to execute the instructions, wherein the instructions causes the processor to be configured to:

obtain the operation log from the receiver, wherein the operation log comprises at least one operation record, and wherein the operation record indicates a record of a write operation of the primary node on either a local cache of the primary node or a storage unit in a storage device;

obtain an operation record from the operation log, wherein the operation record corresponds to a storage unit intersection set, and wherein the storage unit intersection set is an intersection set between a first storage unit set and a second storage unit set, wherein the first storage unit set corresponds to a first standby node, wherein the at least one standby node comprises the first standby node, wherein the first standby node comprises a storage unit that corresponds to the first storage unit set, and wherein the second storage unit set comprises a second storage unit that corresponds to the operation record; and send the operation record to the first standby node using the transmitter.

7. The control node of claim 6, wherein the instructions to determine the first storage unit set further comprises instructions that cause the processor to determine the first storage unit set in the first standby node according to a mapping table, wherein the mapping table comprises at least one entry, wherein each entry comprises an identifier of a standby node and identifiers of storage units that correspond to a local cache of the standby node, and wherein a first entry of the at least one entry comprises an identifier of the first standby node and identifiers of storage units that correspond to a local cache of the first standby node.

8. The control node of claim 7, wherein the receiver is further configured to receive a mapping table update request from a second standby node, and wherein the instructions further causes the processor to be configured to:

obtain the mapping table update request from a second standby node, wherein the mapping table update request comprises an identifier of the second standby node and an identifier of a storage unit, and wherein the second standby node is one of the at least one standby node;

query, in the mapping table, a second entry that corresponds to the identifier of the second standby node; and update, based on the identifier of the storage unit, the second entry.

9. The control node of claim 7, wherein the instructions further causes the processor to be configured to determine a third storage unit set in a third standby node according to the mapping table, wherein the third standby node is a standby node in the at least one standby node other than the first standby node, and wherein the third storage unit set is inconsistent with the first storage unit set.

10. A computer program product comprising computer executable instructions for storage on a non-transitory computer readable storage medium that when executed by a processor of a computer, causes the computer to:

obtain an operation log from a primary node, wherein the operation log comprises at least one operation record, wherein each operation record indicates a record of a write operation on a local cache of the primary node or a storage unit in a storage device, and wherein the primary node and at least one standby node share data in the storage device;

obtain an operation record from the operation log, wherein the operation record to a storage unit intersection set, wherein the storage unit intersection set is an intersection set between a first storage unit set and a second storage unit set, wherein the first storage unit set corresponds to a first standby node, and the at least one standby node comprises the first standby node, and wherein the first standby node comprises a storage unit that corresponds to the first storage unit set, and wherein the second storage unit set comprises a second storage unit that corresponds to the operation record; and send the operation record to the first standby node.

11. The computer program product of claim 10, wherein the computer executable instructions cause the computer to determine the first storage unit set in the first standby node according to a mapping table, wherein the mapping table comprises at least one entry, wherein each entry comprises an identifier of a standby node and identifiers of storage units that correspond to a local cache of the standby node, and wherein a first entry of the at least one entry comprises an identifier of the first standby node and identifiers of storage units that correspond to a local cache of the first standby node.

12. The computer program product of claim 11, wherein the computer executable instructions further causes the computer to:

obtain a mapping table update request from a second standby node, wherein the mapping table update request comprises an identifier of the second standby node and an identifier of a storage unit, and wherein the at least one standby node comprises the second standby node;

query, in the mapping table, a second entry that corresponds to the identifier of the second standby node; and update, based on the identifier of the storage unit, the second entry corresponding to the identifier of the second standby node.

13. The computer program product of claim 11, wherein the computer executable instructions further causes the computer to determine a third storage unit set in a third standby node according to the mapping table, wherein the third standby node is a standby node in the at least one standby node other than the first standby node, and wherein the third storage unit set is inconsistent with the first storage unit set.

14. The computer program product of claim 10, wherein the storage unit is a page.

15. A database system, comprising:

at least one standby node;

a storage device coupled to the at least one standby node and configured to store data;

a primary node coupled to the storage device and the at least one standby node, wherein the primary node is configured to send an operation log, wherein the primary node and the at least one standby node share the data in the storage device, wherein the operation log comprises at least one operation record, and wherein each operation record indicates a record of a write operation performed by the primary node on either a local cache of the primary node or a storage unit in the storage device; and a control node coupled to the at least one standby node, the storage device, and the primary node and configured to:

receive the operation log;

determine a first storage unit set that corresponds to a first standby node, wherein the at least one standby node comprises the first standby node, wherein the first standby node of the at least one standby node is configured to store a storage unit that corresponds to the first storage unit set, and wherein a corresponding storage unit is read from the storage device;

determine a second storage unit set, wherein the second storage unit set comprises a second storage unit that corresponds to the at least one operation record;

obtain an operation record that corresponds to a storage unit intersection set from the operation log;

send the operation record to the first standby node, wherein the storage unit intersection set is an intersection set of storage units in the first storage unit set and the second storage unit set; and wherein the first standby node is configured to:
receive the operation record; and
perform a corresponding operation on a storage unit, in a local cache, indicated by the operation record.

16. The database system of claim 15, wherein determining, by the control node, the first storage unit set, comprises determining the first storage unit set in the first standby node according to a mapping table, wherein the mapping table comprises at least one entry, wherein each entry comprises an identifier of a standby node and identifiers of storage units that correspond to a local cache of the standby node, and wherein a first entry of the at least one entry comprises an identifier of the first standby node and identifiers of storage units that correspond to a local cache of the first standby node.

17. The database system of claim 16, wherein the database system further comprises a second standby node, wherein the second standby node is configured to:
determine whether a local cache of the second standby node comprises a storage unit that corresponds to a read operation instruction in response to receiving the read operation instruction; and
when the local cache does not comprise the storage unit that corresponds to the read operation instruction, the second standby node is configured to:
read the storage unit that corresponds to the read operation instruction from the storage device;
write the storage unit that correspond to the read operation instruction to the local cache of the second standby node; and
send a registration request to the control node, wherein the registration request comprises an identifier of the second standby node and an identifier of the storage unit that corresponds to the read operation instruction, and wherein the second standby node is one of the at least one standby node, and wherein the control node is further configured to:

receive the registration request;
determine, according to the identifier of the second standby node, an entry that corresponds to the identifier of the second standby node; and
add the identifier of the storage unit that corresponds to the read operation instruction to the entry corresponding that corresponds to the identifier of the second standby node.

18. The database system of claim 17, wherein the control node comprises a plurality of physical servers, wherein the second standby node comprises a member list, wherein the member list is configured to record an identifier of a physical server in the physical servers, and wherein sending the registration request to the control node further comprises, sending the registration request to the physical server according to the identifier of the physical server.

19. The database system of claim 16, wherein the database system further comprises a third standby node, and wherein when a storage unit in a local cache of the third standby node is to be deleted, the third standby node is configured to:
determine a to-be-deleted storage unit according to a storage time or a priority of the storage unit in the local cache of the third standby node; and
send a deletion request to the control node, wherein the deletion request comprises an identifier of the third standby node and an identifier of the to-be-deleted storage unit, and wherein the third standby node is one of the at least one standby node; and
wherein the control node is further configured to:
receive the deletion request;
determine, according to the identifier of the third standby node, an entry that corresponds to the identifier of the third standby node; and
delete the identifier of the to-be-deleted storage unit from the entry corresponding to the identifier of the third standby node.

20. The database system of claim 16, wherein the control node is further configured to determine a third storage unit set in a fourth standby node according to the mapping table, wherein the at least one standby node comprises the fourth standby node other than the first standby node, and wherein the third storage unit set is inconsistent with the first storage unit set.

* * * * *

UNITED STATES PATENT AND TRADEMARK OFFICE
CERTIFICATE OF CORRECTION

PATENT NO. : 10,831,612 B2
APPLICATION NO. : 16/522073
DATED : November 10, 2020
INVENTOR(S) : Wei Wang, Jian Li and Wentao Xu Page 1 of 1

It is certified that error appears in the above-identified patent and that said Letters Patent is hereby corrected as shown below:

In the Claims

Claim 12, Column 34, Line 13 and 32: "second entry corresponding to the identifier of the second standby node." should read "second entry."

Claim 17, Column 36, Line 7: "corresponding that corresponds to" should read "that corresponds to"

Signed and Sealed this
Twenty-second Day of December, 2020

Andrei Iancu
*Director of the United States Patent and Trademark Office*